United States Patent
Chen et al.

(10) Patent No.: US 9,521,389 B2
(45) Date of Patent: Dec. 13, 2016

(54) DERIVED DISPARITY VECTOR IN 3D VIDEO CODING

(71) Applicant: QUALCOMM Incorporated, San Diego, CA (US)

(72) Inventors: Ying Chen, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 14/198,442

(22) Filed: Mar. 5, 2014

(65) Prior Publication Data

US 2014/0254682 A1    Sep. 11, 2014

Related U.S. Application Data

(60) Provisional application No. 61/773,680, filed on Mar. 6, 2013, provisional application No. 61/809,174, filed on Apr. 5, 2013.

(51) Int. Cl.
| | | |
|---|---|---|
| *H04N 19/53* | (2014.01) | |
| *H04N 13/00* | (2006.01) | |
| *H04N 19/597* | (2014.01) | |
| *H04N 19/56* | (2014.01) | |

(52) U.S. Cl.
CPC .......... *H04N 13/0007* (2013.01); *H04N 19/56* (2014.11); *H04N 19/597* (2014.11)

(58) Field of Classification Search
CPC .................. H04N 2013/0081; H04N 13/0271; H04N 13/0278; H04N 19/527
See application file for complete search history.

(56) References Cited

U.S. PATENT DOCUMENTS

| | | | | |
|---|---|---|---|---|
| 8,923,399 B2* | 12/2014 | Yang | .................... | H04N 19/176 375/240.13 |
| 2005/0021814 A1 | 1/2005 | Wang et al. | | |
| 2008/0170618 A1* | 7/2008 | Choi | .................. | H04N 13/0022 375/240.16 |
| 2010/0135391 A1* | 6/2010 | Tian | ..................... | H04N 19/597 375/240.12 |
| 2010/0150248 A1* | 6/2010 | Pandit | ................ | H04N 13/0282 375/240.25 |
| 2010/0158129 A1* | 6/2010 | Lai | ....................... | H04N 19/597 375/240.16 |

(Continued)

FOREIGN PATENT DOCUMENTS

WO    2012171442 A1    12/2012

OTHER PUBLICATIONS

Sjoeberg, et al. "Overview of HEVC high-level syntax and reference picture management," IEEE Trans. Circuits Syst. Video Technology, vol. 22, No. 12, pp. 1858-1870, Dec. 2012.

(Continued)

*Primary Examiner* — Christopher Findley
(74) *Attorney, Agent, or Firm* — Shumaker & Sieffert, P.A.

(57) ABSTRACT

A video coder stores only one derived disparity vector (DDV) for a slice of a current picture of the video data. The video coder uses the DDV for the slice in a Neighboring Block Based Disparity Vector (NBDV) derivation process to determine a disparity vector for a particular block. Furthermore, the video coder stores, as the DDV for the slice, the disparity vector for the particular block.

40 Claims, 10 Drawing Sheets

(56) References Cited

U.S. PATENT DOCUMENTS

| | | | | |
|---|---|---|---|---|
| 2010/0177824 | A1* | 7/2010 | Koo | H04N 19/597 375/240.16 |
| 2010/0189182 | A1 | 7/2010 | Hannuksela et al. | |
| 2012/0185570 | A1 | 7/2012 | Bouaziz et al. | |
| 2013/0229485 | A1 | 9/2013 | Rusanovskyy et al. | |
| 2014/0078254 | A1* | 3/2014 | Lin | H04N 19/597 348/43 |
| 2014/0098189 | A1* | 4/2014 | Deng | H04N 13/0048 348/43 |
| 2014/0240456 | A1 | 8/2014 | Kang et al. | |
| 2014/0241430 | A1 | 8/2014 | Zhang et al. | |
| 2014/0355685 | A1 | 12/2014 | Chen et al. | |
| 2015/0201215 | A1* | 7/2015 | Chen | H04N 19/597 348/42 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual service—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 643 pp.

Zhang, et al., "CE5.h: Disparity vector generation results", JCT2-A0097, JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, XP030130096, 5 pp.

Su, et al., "3DV-CE1.a: Block-based View Synthesis Prediction for 3DV-ATM", JCT2-A0107, MPEG Meeting; Jul. 16-20, 2012; Stockholm; (Motion Picture Expert Group or ISO/IEC JTC1/SC29/WG11),, No. m26069, XP030054484, 5 pp.

Sung, et al., "3D-CE5.h: Simplification of disparity vector derivation for HEVC-based 3D video coding," MPEG Meeting; Jul. 16-20, 2012, Document JCT2-A0126, 4 pp.

Kang, et al., "3D-CE5.h related: Improvements for disparity vector derivation", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/ No. JCT3V-B0047, XP030130228, 4 pp.

Tech, et al., "3D-HEVC Test Model 2," JCT3V-B1005_d0, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 118 pp.

Hannuksela, et al., "3D-AVC Draft Text 5," JCT3V-C1002, Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, 82 pp.

Zhang L., et al., "CE2.h related: Derived disparity vector for 3D-HEVC", JCT-3V Meeting, Apr. 20-26, 2013; Incheon, (The Joint Collaborative Team on 3D Video Coding Extension Development of ISO/IEC JTC1/SC29/WG11 and ITU-T SG:16 ), URL: http://phenix.int-evry.fr/jct2/, No. JCT3V-D0194, XP030130858, 4 pp.

Chang, et al., "3D-CE5.h related: Depth-oriented Neighboring Block Disparity Vector (DoNBDV) with virtual depth", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2,, No. JCT3V-B0090, XP030130271, 5 pp.

Guillemot, et al., "3D-CE5.h: Additional merge candidates derived from shifted disparity candidate predictors", JCT-3V Meeting, MPEG Meeting, Jan. 17-23, 2013; Geneva, (The Joint Collaborative Team on 3D Video Coding Extension Development of ISO/IEC JTC1/SC29/WG11 and ITU-T SG.16 ), URL: http://phenix.int-evry.fr/jct2/, No. JCT3V-00148, XP030130564, 6 pp.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, JCTVC-K1003_v12, 11th Meeting: Shanghai, CN, Oct. 10-19, 2012, updated Dec. 16, 2012, 191 pp.

Zhang, et al., "3D-CE5.h related: Advanced residual prediction for multiview coding," Qualcomm Incorporated, Joint Collaborative Team on 3D Video Coding Extension Development of ITU-T SG 16 WP 3 and ISO/IEC JTC 1/SC 29/WG 11, JCT3V-B0051, 2nd Meeting: Shanghai, CN, Oct. 13-19, 2012, 4 pp.

Zhang, et al., "3D-CE5.h related—Disparity vector derivation for multiview video and 3DV", MPEG Meeting, Apr.-May 2012, Geneva, (Motion Picture Expert Group or ISO/IEC JTC1/SC29/WG11),, No. m24937, XP030053280, 6 pp.

Sullivan, et al., "Meeting Report of 4th JCT-3V Meeting", JCT-3V Meeting; Apr. 20-26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/,, No. JCT3V-D1000, XP030130979, 72 pp.

Sullivan, et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 2012, XP011487803, ISSN: 1051-8215, pp. 1649-1668.

Schwarz, et al., "Description of 3D Video Coding Technology Proposal by Fraunhofer HHI (HEVC compatible; configuration A)", MPEG Meeting; Nov. 28-Dec. 2, 2011; Geneva; (Motion Picture Expert Group or ISO/IEC JTC1/SC29/WG11), No. m22570, XP030051133, 46 pp.

Schwarz, et al., "Description of 3D Video Technology Proposal by Fraunhofer HHI (HEVC compatible, configuration B)", 98. MPEG Meeting; Nov. 28-Dec. 2, 2011; Geneva; (Motion Picture Expert Group or ISO/IEC JTC1/SC29/WG11), No. m22571, XP030051134; 46 pp.

(56) References Cited

OTHER PUBLICATIONS

Schwarz, et al., "Test Model under Consideration for HEVC based 3D video coding," ISO/IEC JT1/SC29/WG11 MPEG2011/N12559, Feb. 2012, San Jose, CA, USA, 44 pp.
Vetro, et al. "Joint Draft 8.0 on Multiview Video Coding", 28th JVT meeting, Hannover, Germany, Document: JVT-AB204 (rev.1), Jul. 20-25, 2008. available from http:// wftp3.itu.int/av-arch/jvt-site/2008_07_Hannover/JVT-AB204, 73 pp.
International Search Report and Written Opinion from International Application No. PCT/US2014/021343, dated Jun. 11, 2014, 14 pp.
Response to Written Opinion dated Jun. 11, 2014, from International Application No. PCT/US2014/021343, filed on Sep. 15, 2014, 4 pp.
Second Written Opinion from International Application No. PCT/US2014/021343, dated Mar. 30, 2015, 7 pp.
Response to Second Written Opinion dated Mar. 30, 2015, from International Application No. PCT/US2014/021343, filed on May 18, 2015, 24 pp.
International Preliminary Report on Patentability from International Application No. PCT/US2014/021343, dated Jun. 23, 2015, 7 pp.
Tech et al., "MV-HEVC Working Draft 1," JCT3V-A1004, Jul. 16-20, 2012, Joint Collaborative Team on 3D Video Coding Extension Development of ITUT SG 16 WP 3 and ISO/IEC JTC 1/SC 29/WG 11, 1st Meeting: Stockholm, SE, Aug. 21, 2012, 20 pp.
Tech et al., "MV-HEVC Working Draft 2," JCT3V-B1004, Oct. 13-19, 2012; Joint Collaborative Team on 3D Video Coding Extension Development of ITUT SG 16 WP 3 and ISO/IEC JTC 1/SC 29/WG 11, 2nd Meeting: Shanghai, CN, Nov. 7, 2012, 22 pp.
Tech et al., "3D-HEVC Test Model 2," JCT3V-B1005_d0, Oct. 13-19, 2012; Joint Collaborative Team on 3D Video Coding Extension Development of ITU-T SG 16 WP 3 and ISO/IEC JTC 1/SC 29/WG 11, 2nd Meeting: Shanghai CN, Dec. 23, 2012, 126 pp.
Tech, et al., "3D-HEVC Test Model 1," JCT-3V Meeting, MPEG Meeting; Jul. 16-20, 2012, Document JCT3V-A1005_d0, 83 pp.
Zhao, et al., "CE7: MB-Level NBDV for 3D-AVC," Vienna, AT; Jul. 27-Aug. 2, 2013; (The Joint Collaborative Team on 3D Video Coding Extension Development of ISO/IEC JTC1/SC29/WG11 and ITU-T SG.16); Document JCT3V-E0136, Jul. 19, 2013, 10 pp.
Rusanovskyy, et al., "Common Test Conditions of 3DV Core Experiments," Joint Collaborative Team on 3D Video Coding Extensions of ITU-T SG 13 WP 3 and ISO/IEC JTC 1/SC 29/WG11, Jan. 17-23, 2013, Document: JCT3V-C1100, Jan. 22, 2013, 5 pp.
Lin, et al., "3D-CE3.h related: Unconstrained inside-view motion prediction in 3D video coding," Joint Collaborative Team on 3D Video Coding Extensions of ITU-T SG 13 WP 3 and ISO/IEC JTC 1/SC 29/WG11, Jan. 17-23, 2013; Document: JCT3V-C0136, Jan. 17, 2013, 3 pp.
"Applications and Requirements on 3D Video Coding," ISO/IEC JTC1/SC29/WG11, MPEG2011/N12035, Geneva, Switzerland, Mar. 2011, XP030018528, 7 pp.

\* cited by examiner

Currently coded MB

DERIVED DISPARITY VECTOR IN 3D VIDEO CODING

This application claims the benefit of U.S. Provisional Patent Application No. 61/773,680, filed Mar. 6, 2013, and U.S. Provisional Patent Application No. 61/809,174, filed Apr. 5, 2013, the entire content of each of which is incorporated by reference.

TECHNICAL FIELD

This disclosure relates to techniques for video coding, and more specifically to techniques for 3-dimensional (3D) video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards, to transmit, receive and store digital video information. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

Extensions of some of the aforementioned standards, including H.264/AVC, provide techniques for multi-view video coding in order to produce stereo or three-dimensional ("3D") video. In particular, techniques for multi-view coding have been proposed for use in AVC, including a multi-view video coding (MVC) standard (which has become the multi-view extension to H.264/AVC). A scalable video coding (SVC) standard has also been developed as an extension to H.264/AVC.

Typically, stereo video is achieved using two views, e.g., a left view and a right view. A picture of the left view can be displayed substantially simultaneously with a picture of the right view to achieve a three-dimensional video effect. For example, a user may wear polarized, passive glasses that filter the left view from the right view. In other examples, the pictures of the two views may be shown in rapid succession, and the user may wear active glasses that rapidly shutter the left and right eyes at the same frequency, but with a 90 degree shift in phase.

SUMMARY

In general, this disclosure describes techniques for 3D video coding. In particular, this disclosure is related to disparity vector derivation. In accordance with some techniques of this disclosure, a video coder may store a derived disparity vector (DDV) for a slice of a current picture. The video coder may derive, based at least in part on the DDV for the slice, a Neighboring Block Based Disparity Vector (NBDV) for a first block of the slice. The video coder may code the first block based at least in part on the NBDV for the first block. In addition, the video coder may store the NBDV for the first block as the DDV for the slice. After storing the NBDV for the first block as the DDV for the slice, the video coder may derive, based at least in part on the DDV for the slice, an NBDV for a second block of the slice. In addition, the video coder may code the second block based at least in part on the NBDV for the second block. In some instances, the video coder may store the NBDV for the second block as the DDV for the slice. The video coder may continue this process for additional blocks of the slice. In one example, this disclosure describes a method of decoding video data, the method comprising: storing only one DDV for a slice of a current picture of the video data, wherein the slice includes multiple blocks; using the DDV for the slice in an NBDV derivation process to determine a disparity vector for a particular block, wherein the particular block is one of the blocks of the slice; and storing, as the DDV for the slice, the disparity vector for the particular block.

In another example, this disclosure describes a method of encoding video data, the method comprising: storing only one DDV for a slice of a current picture of the video data, wherein the slice includes multiple blocks; using the DDV for the slice in an NBDV derivation process to determine a disparity vector for a particular block, wherein the particular block is one of the blocks of the slice; and storing, as the DDV for the slice, the disparity vector for the particular block.

In another example, this disclosure describes a video coding device comprising a memory that stores video data; and one or more processors configured to: store only one DDV for a slice of a current picture of the video data, wherein the slice includes multiple blocks; use the DDV for the slice in an NBDV derivation process to determine a disparity vector for a particular block, wherein the particular block is one of the blocks of the slice; and store, as the DDV for the slice, the disparity vector for the particular block.

In another example, this disclosure describes a video coding device configured to code video data, the video coding device comprising: means for storing only one DDV for a slice of a current picture of the video data, wherein the slice includes multiple blocks; means for using the DDV for the slice in an NBDV derivation process to determine a disparity vector for a particular block, wherein the particular block is one of the blocks of the slice; and means for storing, as the DDV for the slice, the disparity vector for the particular block.

In another example, this disclosure describes a non-transitory computer-readable medium having instructions stored thereon that, when executed, cause one or more processors of a video coding device to: store only one DDV for a slice of a current picture of the video data, wherein the slice includes multiple blocks; use the DDV for the slice in an NBDV derivation process to determine a disparity vector for a particular block, wherein the particular block is one of the blocks of the slice; and store, as the DDV for the slice, the disparity vector for the particular block.

The details of one or more examples are set forth in the accompanying drawings and the description below. Other features, objects, and advantages will be apparent from the description, drawings, and claims.

DETAILED DESCRIPTION

Figure 1:
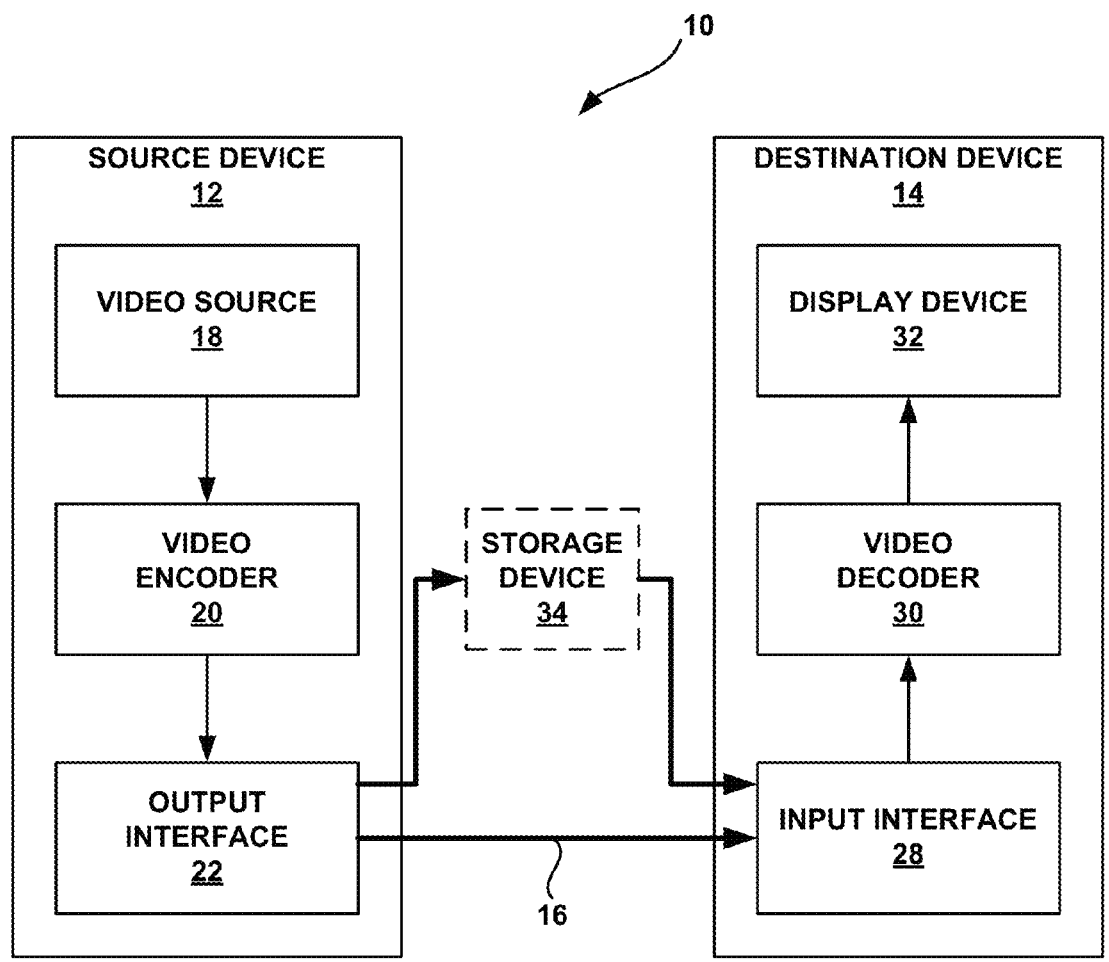
FIG. 1 is a block diagram illustrating an example video encoding and decoding system that may utilize the techniques described in this disclosure.

In general, this disclosure describes techniques for multi-view video coding based on advanced codecs, including the coding of two or more views with the H.264/advanced video coding (AVC) codec (e.g., in a multi-view video coding (MVC) extension of H.264 AVC). This disclosure proposes techniques related to disparity vector derivation. 3D AVC-based video coding (i.e., 3D-AVC) is an AVC-compatible video-plus-depth extension of H.264/AVC for 3-dimensional (3D) video coding. Similar to the MVC plus depth (MVC+D) extension of H.264/AVC, 3D-AVC supports coding of texture and depth map components. However, the techniques of this disclosure may be generically applicable to any multi-view video coding techniques, including multi-view extensions of the High Efficiency Video Coding (HEVC) standard.

In multi-view video coding, the video content of different views may represent different perspectives. For example, a video block in a picture in a first view may include video content that is similar to a video block in a picture in a second view. In this example, the location of the video block in the picture in the first view and the location of the video block in the picture in the second view may be different. For example, there may be some displacement (i.e., disparity) between the locations of the video blocks in the different views. In multi-view video coding, inter-view prediction based on the reconstructed view components from different views may be enabled. Inter-view prediction may achieve coding gains by exploiting the fact that the pictures of each view that represent the same time instance of video may include similar video content.

When a video block in a current picture is coded using inter-view prediction, the block may have a motion vector that indicates a location in an inter-view reference picture. An inter-view reference picture may be a reference picture that is in (i.e., associated with) the same time instance as a current picture, but is in (i.e., associated with) a different view than the current picture. If a motion vector of a block indicates a location in an inter-view reference picture, the motion vector may be referred to as a disparity motion vector. A video coder (e.g., a video encoder or a video decoder) may use a disparity motion vector of a current block to determine a predictive block for the current block. If the video coder is a video encoder, the video coder may use the predictive block for the current block to generate residual data for the current block. If the video coder is a video decoder, the video coder may use the predictive block for the current block and residual data for the current block to reconstruct sample values for the current video block.

Furthermore, a block in a particular picture may have motion information or residual data that is similar to the motion information or residual data of a corresponding block in an inter-view reference picture. Accordingly, a video coder may predict the motion information or residual data of a current block in a current picture based on motion information or residual data of a corresponding block in an inter-view reference picture. The video coder may determine a disparity vector for the current block in order to determine a location of the corresponding block within the inter-view reference picture. The video coder may predict the motion information or residual data of the current block based on the motion information or residual data of the corresponding block in the inter-view reference picture regardless of whether the current block has a disparity motion vector. Thus, if the motion information or residual data of a current block is predicted based on the motion information or residual data of a corresponding block in an inter-view reference picture, the current block is said to have a disparity vector. The disparity vector may be referred as to an implicit disparity vector (IDV) when the disparity vector is used for disparity vector derivation process of blocks coded later. The disparity vector for the current block may be equal to the disparity vector for one of the previous blocks.

The video coder may use a neighboring block-based disparity vector (NBDV) derivation process to derive a disparity vector for a current block. In the NBDV derivation process, the video coder may check blocks that neighbor the current block. The neighboring blocks may include spatial neighboring blocks and temporal neighboring blocks. The spatial neighboring blocks are in the same picture as the current block (i.e., the current picture). The temporal neighboring blocks are in one or more pictures other than the current picture. When the video coder checks a neighboring block, the video coder may determine whether the neighboring block has a disparity motion vector. When the video coder determines that one of the neighboring blocks has a disparity motion vector, the video coder may stop checking neighboring blocks and may convert the disparity motion vector of the neighboring block into the disparity vector for the current block. Furthermore, if none of the neighboring blocks has a disparity motion vector, the video coder may determine whether any of the spatial neighboring blocks has an IDV. When the video coder determines that one of the spatial neighboring blocks has an IDV, the video coder may stop checking neighboring blocks and may convert the IDV of the neighboring block into the disparity vector for the current block.

There are several problems with regard to existing NBDV derivation processes. For example, the use of IDVs in the NBDV derivation process may require a significant increase in storage requirements and number of memory accesses. The techniques of this disclosure may address such problems regarding NBDV derivation processes. For instance, a video coder may, in accordance with a technique of this disclosure, derive, based at least in part on a derived disparity vector (DDV) for a slice of a current picture of the video data, an NBDV for a first block of the slice. The slice may include one or more blocks of video data. The video coder may code the first block based at least in part on the NBDV for the first block. In addition, the video coder may store the NBDV for the first block as an updated DDV for the slice. After storing the NBDV for the first block as the updated DDV, the video coder may derive, based at least in part on the updated DDV, an NBDV for a second block of the slice. In addition, the video coder may code the second block based at least in part on the NBDV for the second block. This process may continue for each block in the slice. In particular, the DDV for the slice may be updated based to be the NBDV of the previous coded block, and then the updated DDV is used to derive the NBDV for the next block. By using a DDV in this manner, the video coder may be able to determine more accurate disparity vectors for blocks of the slice. Increasing the accuracy of disparity vectors may decrease bitstream size.

FIG. 1 is a block diagram illustrating an example video encoding and decoding system 10 that may utilize the techniques described in this disclosure. As used herein, the term "video coder" refers generically to both video encoders and video decoders. In this disclosure, the terms "video coding" or "coding" may refer generically to video encoding or video decoding.

As shown in FIG. 1, system 10 includes a source device 12 that generates encoded video data to be decoded at a later time by a destination device 14. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including desktop computers, notebook (i.e., laptop) computers, tablet computers, set-top boxes, telephone handsets such as so-called "smart" phones, televisions, cameras, display devices, digital media players, video gaming consoles, video streaming devices, or the like. In some cases, source device 12 and destination device 14 may be equipped for wireless communication.

In the example of FIG. 1, source device 12 includes a video source 18, a video encoder 20, and an output interface 22. In some examples, output interface 22 includes a modulator/demodulator (modem) and/or a transmitter. Video source 18 may include a source such as a video capture device (e.g., a video camera), a video archive containing previously-captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. Output interface 22 of source device 12 may transmit the encoded video data directly to destination device 14. Storage device 34 may store the encoded video data for later access by destination device 14 or other devices for decoding and/or playback.

Destination device 14 includes an input interface 28, a video decoder 30, and a display device 32. In some cases, input interface 28 may include a receiver and/or a modem. Input interface 28 of destination device 14 may receive the encoded video data over a link 16. The encoded video data communicated over link 16, or provided on a storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

As indicated above, destination device 14 may receive encoded video data to be decoded via link 16. Link 16 may comprise a type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 34. Similarly, encoded data may be accessed from storage device 34 by input interface 28. Storage device 34 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 34 may correspond to a file server or another intermediate storage device that may hold the encoded video generated by source device 12. Destination device 14 may access stored video data from storage device 34 via streaming or download. The file server may be any type of server capable of storing encoded video data and transmitting that encoded video data to destination device 14. Example file servers include web servers (e.g., for websites), file transfer protocol (FTP) servers, network attached storage (NAS) devices, local disk drives, or other types of devices or systems that provide data to other computing devices. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 34 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Accordingly, signaling may generally refer to providing information in an encoded bitstream for use in processing and/or decoding the encoded bitstream.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based 3DV extension. Furthermore, there is an ongoing effort to generate a three-dimensional video (3DV) coding extension to H.264/AVC, namely AVC-based 3DV or "3D-AVC." A joint draft of the MVC extension of H.264 is described in "Advanced video coding for generic audiovisual services," ITU-T Recommendation H.264, March 2010 (hereinafter, the H.264/AVC specification"). In other examples, video encoder 20 and video decoder 30 may operate according to ITU-T H.261, ISO/IEC MPEG-1 Visual, ITU-T H.262 or ISO/IEC MPEG-2 Visual, and ITU-T H.263, ISO/IEC-4 Visual. The techniques of this disclosure, however, are not limited to any particular coding standard.

As indicated above, a Joint Collaboration Team on 3D Video Coding (JCT-3V) of VCEG and MPEG is currently developing a 3DV standard based on H.264/AVC, i.e., 3D-AVC. For 3D-AVC, new coding tools besides the inter-view prediction in MVC have been included and supported. As of Mar. 3, 2014, software for 3D-AVC (i.e., 3D-ATM) can be downloaded from the following link: [3D-ATM version 6.2]: http://mpeg3dv.research.nokia.com/svn/mpeg3dv/tags/3DV-ATMv6.2/. A draft version of 3D-AVC is available in public: Hannuksela et al., "3D-AVC draft text 5," JCT3V-C1002, Geneva, CH, January, 2013 (hereinafter, "3D-AVC draft text 5") the entire content of which is incorporated herein by reference. As of Mar. 3, 2014, 3D-AVC draft text 5 is available from the following link: http://phenix.it-sudparis.eu/jct2/doc_end_user/documents/3_Geneva/wg11/JCT3V-C1002-v3.zip.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG) or an extension of HEVC. Bross et al., "High Efficiency Video Coding (HEVC) text specification draft 9," 11$^{th}$ Meeting: Shanghai, CN, 10-19 Oct. 2012, document JCTVC-K1003 provides a working draft of the HEVC standard, referred to as "HEVC Working Draft 9." As of Mar. 3, 2014, HEVC Working Draft 9 is available for download at http://phenix.int-evry.fr/jct/doc_end_user/documents/11_Shanghai/wg11/JCTVC-K1003-v12.zip.

Furthermore, there are ongoing efforts to produce multi-view coding and 3DV extensions for HEVC. In other words, a Joint Collaboration Team on 3D Video Coding (JCT-3V)

of VCEG and MPEG is developing a 3DV standard based on HEVC, for which part of the standardization efforts includes the standardization of the multi-view video codec based on HEVC (MV-HEVC) and another part for 3D video coding based on HEVC (3D-HEVC). Video encoder 20 and video decoder 30 may operate according to such extensions to the HEVC standard. The multi-view coding extension of HEVC may be referred to as MV-HEVC. Tech et al., "MV-HEVC Working Draft 1," JCT3V-A1004, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "JCT3V-A1004" or "MV-HEVC Working Draft 1"), provides a working draft for MV-HEVC. Tech et al., "MV-HEVC Working Draft 2," JCT3V-B1004, Joint Collaborative Team on 3D Video Coding Extension Development of ITU-T SG 16 WP 3 and ISO/IEC JTC 1/SC 29/WG 11, 2nd Meeting: Shanghai, CN, 13-19 Oct. 2012 (hereinafter, "MV-HEVC Working Draft 2"), provides another working draft for MV-HEVC.

The 3DV extension of HEVC may be referred to as 3D-HEVC. Tech et al., "Draft of 3D-HEVC Test Model Description Draft," JCT3V-B1005, Joint Collaborative Team on 3D Video Coding Extension Development of ITU-T SG 16 WP 3 and ISO/IEC JTC 1/SC 29/WG 11, 1st Meeting: Stockholm, SE, 16-20 Jul. 2012 (hereinafter, "3D-HEVC Test Model 1") describes reference software as well as a working draft of 3D-HEVC. Tech et al., "3D-HEVC Test Model Description draft 2," JCT3V-B1005, Joint Collaborative Team on 3D Video Coding Extension Development of ITU-T SG 16 WP 3 and ISO/IEC JTC 1/SC 29/WG 11, 2nd Meeting: Shanghai, CN, October 2012 (hereinafter, "3D-HEVC Test Model 2") includes a reference software description as well as another working draft of 3D-HEVC.

A video sequence typically includes a series of video frames. Video encoder 20 typically operates on video blocks within individual video frames in order to encode the video data. This disclosure may use the term "video block" or "block" to refer to one or more sample blocks and syntax structures used to code samples of the one or more blocks of samples (i.e., "sample blocks"). Example types of blocks may include macroblocks, macroblock partitions, sub-macroblocks, coding units, prediction units, coding tree blocks, and so on.

The sample blocks of video blocks may have fixed or varying sizes, and may differ in size according to a specified coding standard. A sample (i.e., a "sample value") may indicate a color component (e.g., a luma or chroma component) of a pixel. In some instances, a sample may indicate a depth value.

In H.264/AVC, a group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describe an encoding mode for the respective frame.

Furthermore, in H.264/AVC, a video block may correspond to a macroblock (MB) or a partition of a macroblock (i.e., a macroblock partition). An MB is a 16×16 block of luma samples and two corresponding blocks of chroma samples of a picture that has three sample arrays, or a 16×16 block of samples of a monochrome picture or a picture that is coded using three separate color planes. A MB partition is a block of luma samples and two corresponding blocks of chroma samples resulting from a partitioning of a macroblock for inter prediction for a picture that has three sample arrays, or a block of luma samples resulting from a partitioning of a macroblock for inter prediction of a monochrome picture or a picture that is coded using three separate color planes. In H.264/AVC, each inter-predicted macroblock may be partitioned in four different ways: one 16×16 macroblock partition, two 16×8 macroblock partitions, two 8×16 macroblock partitions, and four 8×8 macroblock partitions. Different MB partitions in one MB may have different reference index values for each prediction direction (i.e., RefPicList0 or RefPicList1).

The concept of a macroblock in H.264/AVC does not exist in HEVC. Rather, macroblocks are replaced by a highly flexible hierarchical structure based on a generic quadtree scheme. Within this scheme, three types of blocks, i.e., coding units (CUs), prediction units (PUs), and transform units (TUs), are defined. A CU is a basic unit of region splitting. The concept of a CU is analogous to the concept of macroblock, but a CU is not restricted to a maximum size and a CU allows recursive splitting into four equally-sized CUs to improve the content adaptivity. A PU is a basic unit of inter/intra prediction. In some examples, a PU may contain multiple arbitrarily-shaped partitions in a single PU to effectively code irregular image patterns. A TU is a basic unit of transform. TUs of a CU can be defined independently from PUs of the CU. However, a size of a TU is limited to the CU to which the TU belongs. This separation of the block structure into three different concepts may allow each to be optimized according to its role, which may result in improved coding efficiency.

To generate an encoded representation of a picture in HEVC, video encoder 20 may generate a set of coding tree units (CTUs). A CTU may also be referred to as a "tree block" or a "largest coding unit" (LCU). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. Thus, a test model of HEVC describes that a video frame or picture may be divided into a sequence of treeblocks or LCUs that include both luma and chroma samples. The CTUs of HEVC may be broadly analogous to the macroblocks of other standards, such as H.264/AVC. However, a CTU is not necessarily limited to a particular size and may include one or more CUs.

To generate a coded CTU in HEVC, video encoder 20 may recursively perform quad-tree partitioning on the coding tree blocks of a CTU to divide the coding tree blocks into coding blocks, hence the name "coding tree units." In other words, each coding tree block may be split into CUs according to a quadtree. For example, a coding tree block, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. A size of the CU generally corresponds to a size of a coding block of the CU and is typically square in shape. The size of the CU may range from 8×8 pixels up to the size of a CTU with a maximum size of 64×64 pixels or greater.

Video encoder 20 may partition a coding block of a CU into one or more prediction blocks. In general, a PU includes data related to the prediction process. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. A prediction block may be a rectangular (e.g., M×N, where M may or may not be equal to N) block of samples on which the same prediction is applied. Thus, PUs may be partitioned to be non-square in shape. In the context of HEVC and other video coding standards, the terms "video block" or "block" may apply to a LCU, CU, or a PU.

As an example, test models for HEVC support prediction in various PU sizes. Assuming that the size of a particular CU is 2N×2N, test models for HEVC support intra-prediction in PU sizes of 2N×2N or N×N, and inter-prediction in symmetric PU sizes of 2N×2N, 2N×N, N×2N, or N×N. Test models for HEVC also support asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Video encoder 20 may generate predictive blocks (e.g., luma, Cb, and Cr blocks) for prediction blocks (e.g., luma, Cb, and Cr prediction blocks) of each PU of the CU. Hence, in this disclosure, a CU may be said to be partitioned into one or more PUs. For ease of explanation, this disclosure may refer to the size of a prediction block of a PU as simply the size of the PU. Syntax data associated with a CU may describe, for example, partitioning of the CU into one or more PUs. Partitioning modes may differ between whether the CU is skip or direct mode encoded, intra-prediction mode encoded, or inter-prediction mode encoded.

In some examples, when a video block, such as an MB, MB partition, CU, PU, etc., is coded in skip mode, no residual data is signaled for the video block. For instance, in H.264/AVC, a skipped MB is an MB for which no data is coded other than an indication that the MB is to be decoded as "skipped." In some examples, when a video block is coded using direct mode, no motion vector is coded for the video block. For instance, in H.264/AVC, direct prediction is an inter prediction for a block (i.e., a M×N array of samples) of which no motion vector is decoded.

A video frame or picture may be partitioned into one or more slices. A slice may include an integer number of video blocks ordered consecutively in a coding order, such as a raster scan order. In H.264/AVC, a slice may include an integer number of macroblocks ordered consecutively in a coding order. In HEVC, a slice may include an integer number of CTUs ordered consecutively in a coding order. Each slice of a picture may include slice syntax data that describes an encoding mode for the respective slice. A coded slice may comprise a slice header and slice data. The slice header of a slice may be a syntax structure that includes syntax elements that provide information about the slice. The slice data may include coded video blocks of the slice. Video encoder 20 typically operates on video blocks within individual slices (i.e., "video slices") in order to encode the video data.

Video coding standards define various types of slices. For example, H.264/AVC and HEVC define I slices, P slices, and B slices. In general, an I slice is a slice that is decoded using intra prediction only. In general, a P slice is a slice that may be decoded using intra prediction or inter prediction using at most one motion vector and one reference index to predict the sample values of each block. In general, a B slice (i.e., a b-predictive slice) is a slice that may be decoded using intra prediction or inter prediction using at most two motion vectors and reference indices to predict the sample values of each block. Furthermore, H.264/AVC defines additional slice types, such as SI slices and SP slices. An SI slice is a slice that is coded using intra prediction only and using quantization of the prediction samples. Thus, in H.264/AVC, an I slice is a slice that is not an SI slice that is decoded using intra prediction only. An SP slice is a slice that may be coded using intra prediction or inter prediction with quantization of the prediction samples using at most one motion vector and reference index to predict the sample values of each block. Thus, in H.264/AVC, a P slice is a slice that is not an SP slice that may be decoded using intra prediction or inter prediction using at most one motion vector and one reference index to predict the sample values of each block.

When video encoder 20 encodes a current video block, video encoder 20 may generate predictive blocks that correspond to the current video block. Video encoder 20 may perform intra prediction or inter prediction to generate the predictive blocks. For instance, video encoder 20 may encode macroblocks using inter prediction or intra prediction. When video encoder 20 performs intra prediction for a current video block, video encoder 20 may generate, based on samples within the same picture as the current video block, predictive blocks for the current video block. For instance, when video encoder 20 encodes a macroblock using intra prediction, video encoder 20 may generate one or more predictive blocks for the macroblock based on samples in the current picture. A macroblock encoded using intra prediction may be referred to as an intra macroblock. Whereas H.264 provides nine intra-prediction encoding modes, HEVC may provide as many as thirty-three intra-prediction encoding modes. When a PU is intra-mode encoded, the PU may include data describing an intra-prediction mode for the PU.

When video encoder 20 performs inter prediction to generate predictive blocks for a current video block, video encoder 20 may generate the predictive blocks based on samples within one or more reference pictures. The reference pictures may be pictures other than the picture that contains the current video block.

In the context of H.264/AVC, when video encoder 20 encodes a macroblock using inter prediction, video encoder 20 generates one or more predictive blocks for the macroblock based on samples of one or more pictures other than the current picture (i.e., the picture containing the macroblock). A macroblock encoded using inter prediction may be referred to as an inter macroblock.

In the context of HEVC, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector, which may be indicated by a prediction direction.

After video encoder 20 generates predictive blocks for a current video block, video encoder 20 may generate residual blocks for the current video block. Each sample in a residual block may be based on a difference between corresponding samples in a luma or chroma block of the current video block and a predictive block for the current video block. For instance, in the context of HEVC, the residual data may correspond to pixel differences between pixels of the unencoded picture and prediction values corresponding to the CUs. Video encoder 20 may apply a transform to samples of a residual block to generate a transform coefficient block. Video encoder 20 may apply various transforms to the residual block. For instance, in the context of HEVC, following intra-predictive or inter-predictive coding using the PUs of a CU, video encoder 20 may calculate residual data to which the transforms specified by TUs of the CU are applied. In other words, video encoder 20 may form the residual data for the CU, and then transform the residual data to produce transform coefficients. In some examples, video encoder 20 may apply a transform such as a discrete cosine transform (DCT), an integer transform, a wavelet transform, or a conceptually-similar transform to the residual block.

Video encoder 20 may quantize the transform coefficient blocks to further reduce the number of bits used to represent the current video block. Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may, after quantizing a transform coefficient block, scan the quantized transform coefficients to form a 1-dimensional vector (i.e., a serialized vector) of the quantized transform components. In some examples, video encoder 20 may utilize a predefined scan order to scan the quantized transform coefficients to produce a serialized vector. In other examples, video encoder 20 may perform an adaptive scan. Syntax elements representing the quantized transform coefficients may be entropy encoded. In other words, after scanning the quantized transform coefficients to form a one-dimensional vector, video encoder 20 may entropy encode the one-dimensional vector.

The HEVC standard allows for transformations according to TUs, which may be different for different CUs. In general, a TU is used for the transform and quantization processes. A given CU having one or more PUs may also include one or more TUs. Following prediction, video encoder 20 may calculate residual values from the video block identified by the coding node in accordance with the PU. The coding node is then updated to reference the residual values rather than the original video block. The residual values may comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients.

Video encoder 20 may entropy encode syntax elements that represent transform coefficients in the transform coefficient block and other syntax elements associated with the current video block. For example, video encoder 20 may perform context-adaptive binary arithmetic coding (CABAC), context-adaptive variable length coding (CAVLC), exponential-Golomb coding, syntax-based context-adaptive binary arithmetic coding (SBAC), Probability Interval Partitioning Entropy (PIPE), or another type of entropy encoding on the syntax elements. Video encoder 20 may output a bitstream that includes the entropy-encoded syntax elements and other syntax elements associated with the current video block.

In HEVC, video encoder 20 may use quad-tree partitioning to decompose the one or more residual blocks of a CU (e.g., luma, Cb, and Cr residual blocks of the CU) into one or more transform blocks (e.g., luma, Cb, and Cr transform blocks). A transform block is a rectangular (e.g., square or non-square) block of samples on which the same transform is applied. A TU of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block. In this way, residual samples corresponding to a CU may be subdivided into smaller units using a quadtree structure known as a "residual quad tree" (RQT). The leaf nodes of the RQT may be referred to as TUs. Syntax data associated with a CU may also describe, for example, partitioning of the CU into one or more TUs according to a quadtree.

In some examples, TUs of a CU defined for a partitioned LCU are sized based on the size of PUs of the CU, although this may not always be the case. In some examples, the TUs are the same size or smaller than the PUs.

Furthermore, in HEVC, video encoder 20 may apply one or more transforms to a transform block of a TU to generate a coefficient block for the TU. A coefficient block may be a two-dimensional array of transform coefficients. For example, video encoder 20 may apply one or more transforms to a luma transform block of a TU to generate a luma coefficient block for the TU. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. In this way, pixel difference values associated with the TUs may be transformed to produce transform coefficients, which may be quantized.

The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units. A NAL unit that encapsulates a coded slice may be referred to as a coded slice NAL unit.

Video decoder 30 may receive a bitstream that includes an encoded representation of video data. Video decoder 30 may parse the bitstream to extract syntax elements from the bitstream. As part of extracting the syntax elements from the bitstream, video decoder 30 may entropy decode portions of the bitstream. Video decoder 30 may perform, based at least in part on the syntax elements associated with a current video block (e.g., an MB or MB partition, etc.), inter or intra prediction to generate predictive blocks. In addition, video decoder 30 may inverse quantize transform coefficients of transform coefficient blocks and may apply one or more inverse transforms to the transform coefficient blocks to generate residual blocks. Video decoder 30 may then reconstruct the luma and chroma blocks of the current video block based at least in part on the residual blocks and the predictive blocks. In this way, by reconstructing the luma and chroma blocks of each video block of a picture, video decoder 30 may reconstruct the picture.

As mentioned above, video encoder 20 may perform inter prediction to generate predictive blocks for a particular video block. More specifically, video encoder 20 may perform uni-directional inter prediction or bi-directional inter prediction to generate the predictive blocks.

When video encoder 20 performs uni-directional inter prediction for a current video block (e.g., an MB, MB partition, PU, etc.), video encoder 20 may search for a reference block within reference pictures in a single reference picture list (e.g., "List 0" or "RefPicList0"). The reference block may be a block of luma samples and corresponding blocks of chroma samples that are similar to the luma and chroma blocks of the current video block. Furthermore, when video encoder 20 performs uni-directional inter prediction, video encoder 20 may generate motion information for the particular video block. The motion information for the particular video block may include a motion vector and a reference index. The motion vector may indicate a spatial displacement between a position within the current picture of the sample blocks of the current video block and a position within the reference picture of the reference block. The reference index indicates a position within the reference picture list of the reference picture that contains the reference block. Samples in the predictive blocks for the current video block may be equal to corresponding samples in the reference block.

When video encoder 20 performs bi-directional inter prediction for a current video block (e.g., an MB, MB partition, PU, etc.), video encoder 20 may search for a first reference block within reference pictures in a first reference picture list ("list 0" or "RefPicList0") and may search for a second reference block within reference pictures in a second reference picture list ("list 1" or "RefPicList1"). Video encoder 20 may generate, based at least in part on the first and the second reference blocks, the predictive blocks for the current video block. In addition, video encoder 20 may generate a first motion vector that indicates a spatial displacement between a sample block of the current video block and the first reference block. Video encoder 20 may also generate a first reference index that identifies a location within the first reference picture list of the reference picture that contains the first reference block. Furthermore, video encoder 20 may generate a second motion vector that indicates a spatial displacement between the blocks of the current video block and the second reference block. Video encoder 20 may also generate a second reference index that identifies a location within the second reference picture list of the reference picture that includes the second reference block.

When video encoder 20 performs uni-directional inter prediction for a current video block (e.g., an MB, MB partition, PU, etc.), video decoder 30 may use the motion information of the current video block to identify the reference block of the current video block. Video decoder 30 may then generate the predictive blocks for the current video block based on the reference block of the current video block. When video encoder 20 performs bi-directional inter prediction for the current video block, video decoder 30 may use the motion information for the current video block to identify the two reference blocks of the current video block. Video decoder 30 may generate the predictive blocks of the current video block based on the two reference blocks of the current video block.

In H.264/AVC, when an MB is not partitioned into four 8×8 MB partitions, the MB may have only one motion vector for the whole MB partition in each prediction direction (i.e., RefPicList0 or RefPicList1). When an MB is partitioned into four 8×8 MB partitions, each 8×8 MB partition can be further partitioned into sub-blocks. There are four different ways to partition sub-blocks from an 8×8 MB partition: one 8×8 sub-block, two 8×4 sub-blocks, two 4×8 sub-blocks, or four 4×4 sub-blocks. Each sub-block can have a different motion vector in each prediction direction. The manner in which an 8×8 MB partition is partitioned into sub-blocks may be called a sub-block partition.

Multi-view video coding (MVC) is an extension of H.264/AVC. In multi-view coding, there may be multiple views of the same scene from different viewpoints. In the context of multi-view coding, the term "access unit" may refer to a set of pictures that correspond to the same time instance. Thus, video data may be conceptualized as a series of access units occurring over time.

In multi-view coding, a bitstream may have a plurality of layers. Each of the layers may correspond to a different view. In multi-view coding, a view may be referred to as a "base view" if a video decoder (e.g., video decoder 30) can decode pictures in the view without reference to pictures in any other view. A view may be referred to as a non-base view if decoding of the view is dependent on decoding of pictures in one or more other views.

Figure 2:
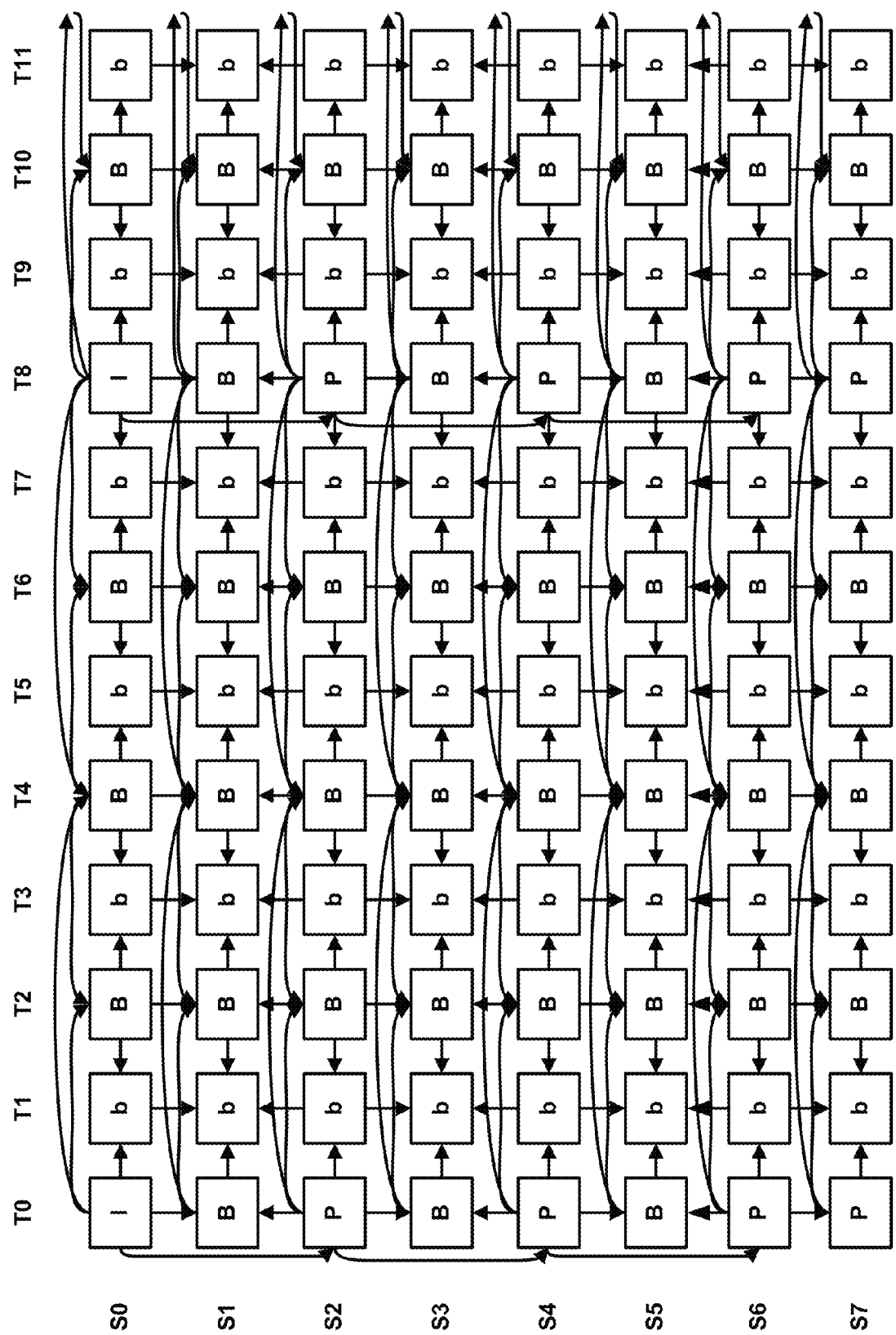
FIG. 2 is a conceptual diagram illustrating an example prediction structure for multi-view coding.

FIG. 2 is a conceptual diagram illustrating an example prediction structure for multi-view coding. A typical MVC prediction (including both inter-picture prediction within each view and inter-view prediction) structure for multi-view video coding is shown in FIG. 2, where predictions are indicated by arrows, the pointed-to object using the pointed-from object for prediction reference.

The multi-view prediction structure of FIG. 2 includes temporal and inter-view prediction. In the example of FIG. 2, each square corresponds to a view component. In the example of FIG. 2, access units are labeled T0 . . . T11 and views are labeled S0 . . . S7. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 2, view components in different views of the same access unit may be available as reference pictures. The use of one view component of an access unit as a reference picture for another view component of the same access unit may be referred to as inter-view prediction.

In MVC, inter-view prediction is performed among pictures captured in the different views of the same access unit (i.e., within the same time instance) to remove correlation between views. A picture coded with inter-view prediction may be added into a reference picture list for the inter-view prediction of the other non-base views. An inter-view prediction reference picture can be put in any position of a reference picture list in the same way with an inter prediction reference picture.

In the context of multi-view video coding, there are two kinds of motion vectors. One kind of motion vector is a normal motion vector that points to a temporal reference picture (i.e., a picture in a different time instance than a current picture). The type of inter prediction corresponding to a normal, temporal motion vector may be referred to as "motion-compensated prediction" or "MCP." When an inter-view prediction reference picture is used for motion compensation, the corresponding motion vector may be referred to as a "disparity motion vector." In other words, a disparity motion vector points to a picture in a different view (i.e., a disparity reference picture or an inter-view reference picture). The type of inter prediction corresponding to a disparity motion vector may be referred to as "disparity-compensated prediction" or "DCP."

Figure 3:
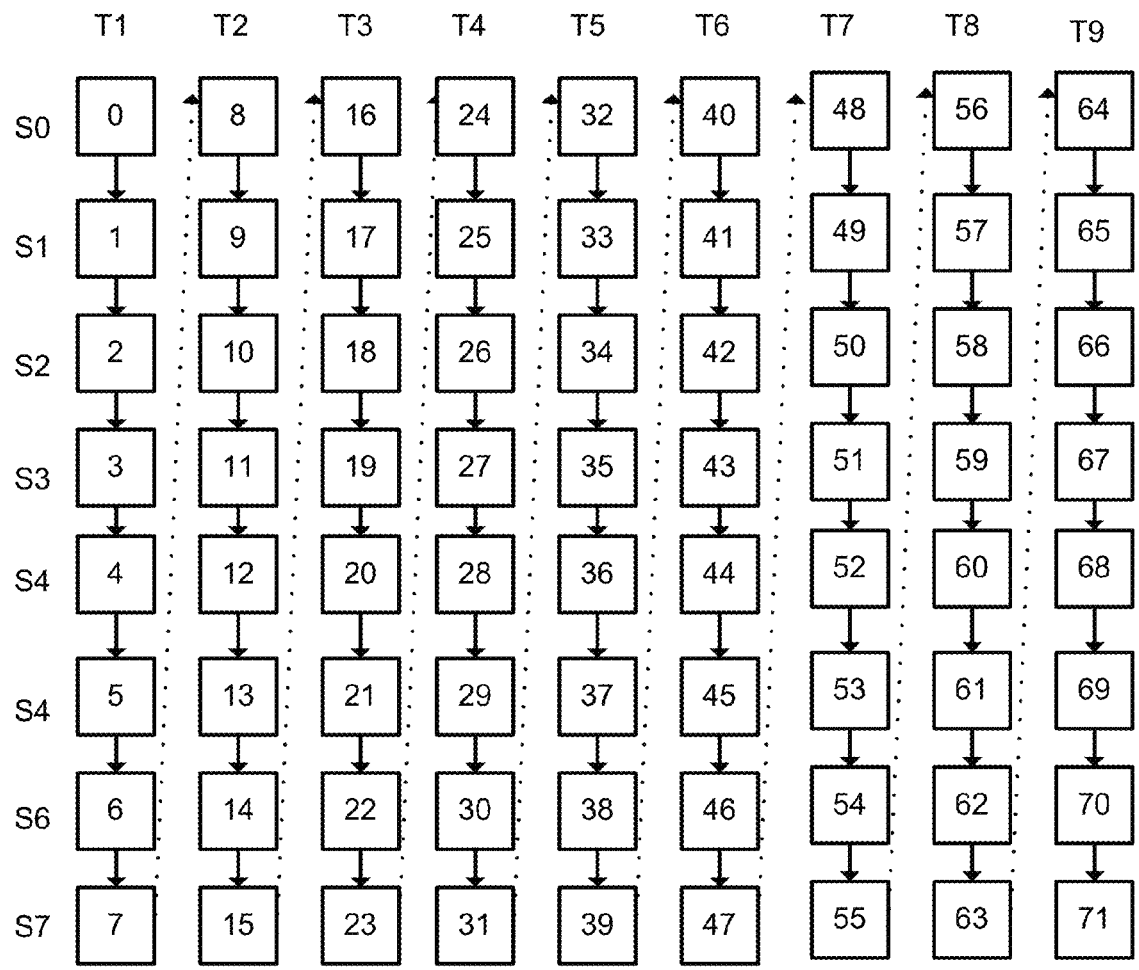
FIG. 3 is a conceptual diagram illustrating an example multi-view decoding order.

FIG. 3 is a conceptual diagram illustrating an example multi-view decoding order. In other words, a typical MVC decoding order (i.e. bitstream order) is shown in FIG. 3. The decoding order arrangement is referred to as time-first coding. Note that the decoding order of access units may not be identical to the output or display order. In FIG. 3, S0-S7 each refers to different views of the multi-view video. T1-T9 each represents one output time instance. An access unit may include the coded pictures of all the views for one output time instance. For example, a first access unit may include all of the views S0-S7 for time instance T1, a second access unit may include all of the views S0-S7 for time instance T2, and so forth.

The following section discusses multi-view and 3D video coding in general. In the context of multi-view and 3D video coding, a "view component" may be a coded representation of a view in a single access unit. When a view includes both coded texture and depth representations, a view component may comprise (e.g., consist of) a texture view component and a depth view component. Thus, each texture view component may have a corresponding depth view component. In general, the texture view components include video content (e.g., luma and chroma components of pixel values), and the depth view components may indicate relative depths of the pixels within the texture view components. Thus, the plurality of video pictures for each view may be referred to as texture view components. In this disclosure, a "view" may refer to a sequence of view components associated with the same view identifier.

More specifically, a texture view component (i.e., a texture picture) may be a coded representation of the texture of a view in a single access unit. The texture view component includes the actual image content that is displayed. For example, the texture view component may include luma (Y) and chroma (Cb and Cr) components. A texture view may be a sequence of texture view components associated with an identical value of view order index. A view order index of a view may indicate a camera position of the view relative to other views.

The techniques of this disclosure relate to coding 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data for blue hues (Cb) and red hues (Cr). In certain chroma sampling formats, such as 4:2:2 or 4:2:0, the chroma data is downsampled relative to the luma data. That is, the spatial resolution of chrominance pixels may be lower than the spatial resolution of corresponding luminance pixels, e.g., one-half or one-quarter of the luminance resolution.

A depth view component (i.e., a depth picture) may be a coded representation of the depth of a view in a single access unit. A depth view may be a sequence of depth view components associated with an identical value of view order index. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

In some examples, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a dark gray pixel in the depth view component may indicate that its corresponding pixel in the texture view component is further away than a light gray pixel in the depth view component. Because only gray scale is needed to identify the depth of pixels, the depth view component need not include chroma components, as color values for the depth view component may not serve any purpose. The depth view component using only luma values (e.g., intensity values) to identify depth is provided for illustration purposes and should not be considered limiting.

In other examples, any technique may be utilized to indicate relative depths of the pixels in the texture view component.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and may use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in a second view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur to present a slight perception of depth, or may be displayed in different locations for the left and right eye (e.g., with horizontal disparity that is opposite that of pixels located in front of the zero disparity plane). Many other techniques may also be used to convey or define depth data for an image.

For each pixel in the depth view component, there may be one or more corresponding pixels in the texture view component. For instance, if the spatial resolutions of the depth view component and the texture view component are the same, each pixel in the depth view component corresponds to one pixel in the texture view component. If the spatial resolution of the depth view component is less than that of the texture view component, then each pixel in the depth view component corresponds to multiple pixels in the texture view component. The value of the pixel in the depth view component may indicate the relative depth of the corresponding one or more pixels in the texture view.

In some examples, a video encoder signals video data for the texture view components and the corresponding depth view components for each of the views. Video decoder 30 may utilize both the video data of texture view components and the depth view components to decode the video content of the views for display. A display then displays the multi-view video to produce 3D video.

Referring back to FIG. 3, each of the views includes sets of pictures. For example, view S0 includes a set of pictures 0, 8, 16, 24, 32, 40, 48, 56, and 64, view S1 includes a set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The next section of this disclosure discusses the AVC-based 3D video coding standard (i.e., 3D-AVC). A coding order of view components in 3D-AVC is discussed below. 3D-AVC is compatible to H.264/AVC in a way that the texture part of the base view is fully decodable for H.264/AVC decoder. For enhanced view components in 3D-AVC, the depth may be coded prior to the texture and a texture view component may be coded based on the information from the depth view component, which is also known as a depth-first coding. In contrast, each texture view component is coded before the respective depth view components in texture-first coding orders. For example, the coding orders of the texture and depth view components in the 3D-AVC may be exemplified as follows; wherein T0 and D0, respectively, refer to the texture and depth view components of the base view, and T1 and D1, respectively, refer to the texture and depth view components of the i-th dependent view. In the following examples there are three views:

T0 D0 D1 D2 T1 T2: The base views (T0 and D0) are coded with the texture-first coding order while the dependent view is coded with the depth-first coding order. Hybrid coding order is currently used in common test conditions of 3D-AVC.

T0 D0 T1 D1 T2 D2: All the view components are coded with the texture-first coding order.

If inter-view prediction is enabled for Ti, the reference texture view is defined as the view which includes the inter-view reference picture and the corresponding depth view is defined as the reference depth view which has the same view order index as that of the reference texture view.

A video coder may use a disparity vector (DV) as an estimator of the disparity between two views. Because neighboring blocks share almost the same motion/disparity information in video coding, the current block can use the motion vector information in neighboring blocks as a good predictor. 3D-AVC disparity vector derivation via the depth map is now discussed. Techniques for deriving the disparity vector may vary with each low-level coding tool, but, commonly, the depth data of the dependent views is employed for the texture view component coding owing to the depth-first coding order.

An in-loop block-based view synthesis inter-view prediction (BVSP) and depth-based motion vector prediction (D-MVP) in the 3D-AVC are the low-level coding tools, mainly, using the disparity vector converted from the depth values of the depth map in the dependent frame. Typically, in the 3D-AVC software, the results of the conversion process from the actual depth map value to a disparity to a particular view are stored in look-up tables with camera parameters.

BVSP may be enabled in 3D-AVC. BVSP was originally proposed in Su et al., "3DV-CE1.a: Block-based View Synthesis Prediction for 3DV-ATM," Joint Collaborative Team on 3D Video Coding Extension Development of ITU-T SG 16 WP 3 and ISO/IEC JTC 1/SC 29/WG 11, $1^{st}$ Meeting, Stockholm, SE, 16-20 Jul. 2012, document JCT3V-A0107 (hereinafter, "JCT3V-A0107"), which, as of Mar. 3, 2014, can be downloaded from the following link: http://phenix.it-sudparis.eu/jct2/doc_end_user/documents/1_Stockholm/wg11/JCT3V-A0107-vl.zip.

Figure 4:
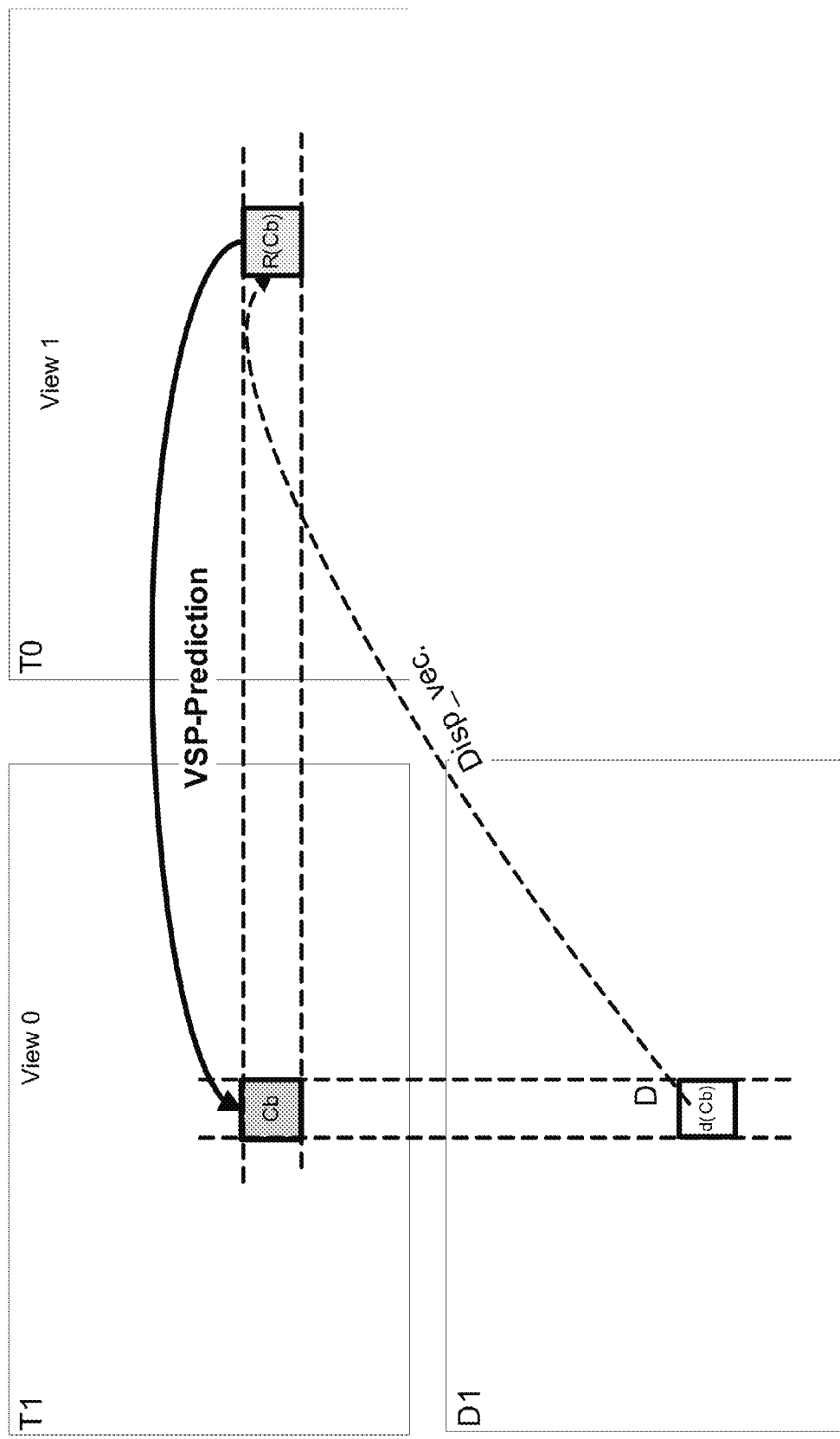
FIG. 4 is an example conceptual visualization of block-based view synthesis prediction VSP (B-VSP) based on backward warping.

FIG. 4 is an example conceptual visualization of BVSP based on backward warping. Referring to FIG. 4, assume that the following coding order is utilized: (T0, D0, D1, T1). Texture component T0 is a base view, and T1 is a dependent view coded with the VSP. Depth map components D0 and D1 are respective depth maps associated with T0 and T1.

In dependent view T1, sample values of current block Cb are predicted from reference area R(Cb) that consists of sample values of the base view T0. The displacement vector between coded and reference samples is denoted as a derived disparity vector between T1 and T0 from a depth map value associated with a currently coded texture sample.

In some examples, a video coder may use the following equations to perform a process of conversion from a depth value to a disparity vector:

$$Z(Cb(j, i)) = \frac{1}{\frac{d(Cb(j, i))}{255} \cdot \left(\frac{1}{Znear} - \frac{1}{Zfar}\right) + \frac{1}{Zfar}};$$ (1)

$$D(Cb(j, i)) = \frac{f \cdot b}{Z(Cb(j, i))};$$ (2)

where j and i are local spatial coordinates within Cb, d(Cb(j, i)) is a depth map value in a depth map image of a view #1, Z is the actual depth value of d(C(j, i)), and D is the horizontal component of a derived disparity vector to a particular view #0. The parameters f, b, Znear and Zfar are parameters specifying the camera setup, i.e., the used focal length (f), camera separation (b) between view #1 and view #0, and depth range (Znear, Zfar) represent parameters of depth map conversion.

In some examples, the vertical component of the derived disparity vector is always set equal to 0. In a current implementation of 3D-AVC (i.e., a 3DV-ATM implementation), equations (1) and (2) have been already pre-computed for every depth map value (0 . . . 255) and stored as a look-up table. Thus, a video coder may use the look-up table to convert depth values to disparity vectors without calculating equations (1) and (2) provided above.

One implementation issue related to BVSP involves the indication of BVSP blocks. In some examples, BVSP blocks are indicated as follows. One flag at the MB level signals whether a current MB is coded with the conventional skip/direct mode or whether the current MB is coded with the skip/direct mode but predicted from a synthetic reference component. For each MB partition (from 16×16 to 8×8), a reference index corresponding to a reference picture list signals a reference picture in the reference picture list. When a video encoder uses BVSP mode to encode an MB partition, the video encoder does not signal the motion vector differences (MVDs) for the MB partition because there are no motion vectors for BVSP coded blocks. When either the flag or a reference index indicates that an MB partition is coded using a synthetic reference component, a video coder may invoke the prediction of one partition as described below.

Another implementation issue related to BVSP involves the prediction derivation process. N×M may denote the size of a MB partition, where N or M is equal to 8 or 16. If the MB partition is coded with BVSP mode, the MB partition is further partitioned into several sub-regions with the size equal to K×K, where K may be 4×4, 2×2 or 1×1. For each sub-region of the MB partition, a video coder derives a separate derived disparity vector. Furthermore, for each respective sub-region of the MB partition, the video coder uses the derived disparity vector to locate a corresponding block in the inter-view reference picture, i.e., R(cb) in FIG. 4. The video coder may predict the respective sub-region from the corresponding block for the respective sub-region. One example of BVSP is based on backward warping for blocks with a size of 4×4 (meaning K is equal to 4.) The derived disparity vectors are not stored for BVSP coded blocks because there are no coding tools that use such vectors.

Another implementation issue involves the disparity vector derivation process. When depth first coding order is applied, a video coder may obtain the derived disparity vector by converting a depth value of the corresponding depth block in the corresponding non-base depth view, as shown in FIG. 4. Several techniques may be applied to select the depth value of one depth block, such as the depth value of the center position of the depth block, the maximum value of all depth values within one depth block, the maximum value of four corner pixels within one depth block, and the depth value of the bottom-right pixel of the depth block/depth MB. When texture first coding order is applied, the video coder may disable BVSP modes because the corresponding non-base depth view is unavailable when decoding the non-base texture view.

Depth-based motion vector prediction (D-MVP) in 3D-AVC for normal inter modes is now be discussed. D-MVP is a motion vector prediction method incorporating associated depth map data in the current view, which is available due to the depth-first coding order. A video coder may apply D-MVP with the texture view components in dependent (i.e., non-base) views.

In 3D-AVC, the D-MVP method is incorporated into the conventional median function-based motion vector prediction in H.264/AVC. Specifically, the type of motion vector to be predicted (i.e., whether temporal motion vector or disparity motion vector) is first identified in a way that reference indices of the motion vectors in neighboring blocks are checked to know the type of motion prediction.

The neighboring blocks include, in order, a left block, an above block, an above-right block, and an above-left block relative to the current block. In some examples, a video coder may only use the motion vector in the above-left block when one of the other three neighboring blocks (i.e., the left block, the above block, and the above-right block) do not contain a motion vector, and are thus considered as unavailable.

Afterwards, if three neighboring blocks are available, the video coder may employ the motion vectors in the three neighboring blocks for the motion vector prediction of motion vectors for the current block. In temporal prediction, if the motion vectors of the three neighboring blocks all have the same type and all have the same reference indices, the video coder may use a median filter directly as described in H.264/AVC. Otherwise (if the motion vectors of the three neighboring blocks belong to different types and the three neighboring blocks have the different reference indices), the video coder may further derive a motion vector for the current block. When the current reference picture is an inter-view reference picture, the video coder may check the motion vector types and their reference indices in neighboring block positions. If the motion vectors have all the same type and the same reference indices, the video coder may apply the median filter. In both cases, if less than three neighboring blocks are available, the video coder may further derive motion vectors for the unavailable blocks so that three neighboring blocks become available.

A motion vector derived for a neighboring block may be referred to as a derived motion vector. To derive a motion vector of a current block, a video coder may determine whether a current motion vector (i.e., a motion vector of a neighboring block) is a disparity motion vector, whether the motion vector of the neighboring block has a different type than the type of the current motion vector, or whether the motion vector of the neighboring block is unavailable. If any of these conditions applies, the video coder may set the derived motion vector of the current block to be a disparity motion vector, which the video coder may convert from the corresponding depth view component. The video coder may convert the maximum value of the depth values of the four corners of the corresponding block of the depth view component of the same view to a disparity value. The video coder may set the disparity value to the horizontal component of the derived motion vector. The video coder may set the vertical component of the derived motion vector to be zero.

If the current motion vector is a temporal motion vector, the video coder may use the disparity value (derived similarly as mentioned above) to determine a temporal motion vector of the reference block in the reference (base) view. The video coder may set the derived motion vector to be the temporal motion vector. If the temporal motion vector is considered to be unavailable (e.g., the temporal neighboring block is an intra block or a motion vector of the temporal neighboring block does not point to a reference picture in the reference view aligned with the current reference picture), the video coder may set the derived motion vector to zero.

Inter-view motion prediction in 3D-AVC for skip and direct modes are now discussed. As described in sections 7.3.5 and 7.4.5 of the H.264/AVC specification, a macroblock_layer syntax structure for a macroblock may include an mb_type syntax element that specifies a macroblock type for the macroblock. The semantics of the mb_type syntax element depend on the slice type of the slice containing the macroblock. If the slice is a P slice, the macroblock types include a P_Skip type. When the macroblock type of a macroblock is P_Skip, no further data is present for the macroblock in the bitstream. If the slice is a B slice, the macroblock types include a B_Skip mode and a B_Direct_16x16 mode (i.e., a B-16x16 direct mode). When the macroblock type of a macroblock is B_Skip, no further data is present for the macroblock in the bitstream. When the macroblock type of a macroblock is B_Direct_16x16, no motion vector differences or reference indices are present for the macroblock in the bitstream. Furthermore, when the macroblock type of a macroblock is B_Direct_16x16, the functions MbPartWidth(B_Direct_16x16), and MbPartHeight(B_Direct_16x16) are used in the derivation process for motion vectors and reference frame indices in subclause 8.4.1 of the H.264/AVC specification for direct mode prediction.

Furthermore, a macroblock_layer syntax structure may include one or more sub_mb_pred syntax structures. A sub_mb_pred syntax structure may include four sub_mb__type syntax elements that specify sub-macroblock types. The sub-macroblock types include a B_Direct_8x8 mode (i.e., a B-8x8 direct mode). When the sub-macroblock type of a sub-macroblock is B_Direct_8x8, no motion vector differences or reference indices are present for the sub-macroblock in the bitstream. The functions SubMbPartWidth(B_Direct_8x8) and SubMbPartHeight(B_Direct_8x8) are used in the derivation process for motion vectors and reference frame indices in subclause 8.4.1 of the H.264/AVC specification for direct mode prediction.

A video coder may perform inter-view motion prediction in 3D-AVC in P-skip, B-skip, B-16x16 direct mode, and B-8x8 direct mode. To perform inter-view motion prediction, the video coder may first derive a disparity vector for a current block from the neighboring blocks, as well as the disparity vector converted from the depth values of the depth view component of the same view. If one available spatial neighboring block contains a disparity motion vector, the video coder may determine that this disparity motion vector is the disparity vector for the current block. Otherwise, when none of the neighboring blocks has a disparity motion vector, the video coder may convert a disparity motion vector of a block from the depth values (similar to the conversion in D-MVP). Afterwards, the video coder may apply a median filter to three neighboring blocks to determine the disparity vector for the current block.

The video coder may use the disparity vector for the current block to determine a temporal motion vector of the reference block in the reference (e.g., base) view. If the temporal motion vector is unavailable, the video coder may firstly derive the reference index and the video coder may apply D-MVP, as discussed above, to produce a motion vector predictor.

3D-AVC and multi-view extensions of HEVC may use Neighboring Block-Based Disparity Vector (NBDV) derivation processes to derive disparity vectors for blocks. In general, an NBDV derivation process uses neighboring disparity information for estimating a disparity vector for a current block. Several spatial and temporal neighboring candidate blocks are initially defined. The video coder may check each of the neighboring blocks in a pre-defined order. The pre-defined order may be determined by a priority of the correlation between the current block and the neighboring blocks. Once the video coder determines that a neighboring block has a disparity motion vector (i.e., a motion vector of the neighboring block points to an inter-view reference picture), the video coder may convert the disparity motion vector to a disparity vector for the current block.

In general, the video coder may use two sets of neighboring blocks when performing an NBDV derivation process. One set of neighboring blocks is from spatial neighboring blocks and the other set of neighboring blocks is from temporal neighboring blocks. In some examples, the term NBDV is used to refer to a disparity vector of a block if an NBDV derivation process was used to derive the disparity vector of the block.

A video coder may use the NBDV derivation process as a disparity vector derivation method in 3D-HEVC, which uses the texture-first coding order for all the views. In the current 3D-HEVC design, the video coder may also use the NBDV derivation process to retrieve depth data from a depth map of a reference view. 3D-HEVC first adopted the NBDV method proposed in Zhang et al., "Disparity vector generation results," Joint Collaborative Team on 3D Video Coding Extension Development of ITU-T SG 16 WP 3 and ISO/IEC JTC 1/SC 29/WG 11 1st Meeting: Stockholm, SE, 16-20 Jul. 2012, document JCT3V-A0097 (hereinafter, JCT3V-A0097). Implicit disparity vectors are included with a simplified NBDV in JCT3V-A0126: Sung et al., "3D-CE5.h: Simplification of disparity vector derivation for HEVC-based 3D video coding," Joint Collaborative Team on 3D Video Coding Extension Development of ITU-T SG 16 WP 3 and ISO/IEC JTC 1/SC 29/WG 11 1st Meeting: Stockholm, SE, 16-20 Jul. 2012, document. JCT3V-A0126 (hereinafter, JCT3V-A0126). In addition, in Kang et al., "3D-CE5.h related: Improvements for disparity vector derivation," Joint Collaborative Team on 3D Video Coding Extension Development of ITU-T SG 16 WP 3 and ISO/IEC JTC 1/SC 29/WG 11 2nd Meeting: Shanghai, CN, 13-19 Oct. 2012, document JCT3V-B0047 (hereinafter, JCT3V-B0047), the NBDV derivation process is further simplified by removing the implicit disparity vectors stored in the decoded picture buffer, while achieving an improved coding gain with the random access picture (RAP) selection.

In some NBDV derivation processs, a video coder uses five spatial neighboring blocks for disparity vector derivation. The five spatial neighboring blocks are the below-left, left, above-right, above and above-left blocks of a current PU, denoted by $A_0$, $A_1$, $B_0$, $B_1$ and $B_2$. The five spatial neighboring blocks used in the proposed NBDV derivation process may be the same five spatial neighboring blocks used in the merge modes in HEVC. Therefore, in some examples, no additional memory access is required to access the five spatial neighboring blocks.

For checking temporal neighboring blocks, a video coder may first perform a construction process of a candidate picture list. The video coder may treat all the reference pictures from the current view as candidate pictures. The video coder may first insert a so-called co-located reference picture into the candidate picture list, followed by the rest of candidate pictures (i.e., reference pictures in the current view) in the ascending order of reference index. That is, the video coder may insert the remaining candidate pictures into the candidate picture list in accordance with the order that the remaining candidate pictures occur in reference picture lists (e.g., RefPicList0 and RefPicList1) of the current picture. One or more syntax elements in a slice header of a slice containing the current block may indicate the co-located picture. In some examples, when the reference pictures with the same reference index in both reference picture lists (e.g., RefPicList0 and RefPicList1) are available for use in the NBDV derivation process, the reference picture in the same reference picture list as the co-located picture precedes, in the candidate picture list, the other reference picture.

When a video coder codes a block with inter-view motion prediction, the video coder may derive a disparity vector for selecting a corresponding block in a different view. The term "implicit disparity vector" or "IDV" (or in some circumstances a "derived disparity vector") may refer to a disparity vector derived in inter-view motion prediction. For instance, even though a video coder may code a block with motion prediction (i.e., temporal motion prediction), the video coder does not discard the derived disparity vector. Rather, the video coder may use the disparity vector for the purpose of coding a following block. Specifically, the video coder may treat the disparity vector as an implicit disparity vector and may use the implicit disparity vector in an NBDV derivation process to determine a disparity vector for one or more other blocks.

Typically, when a video coder performs the NBDV derivation process, the video coder checks disparity motion vectors in the temporal neighboring blocks, disparity motion vectors in the spatial neighboring blocks, and then the implicit disparity vector in order. Once the video coder finds the disparity vector, the video coder may terminate the NBDV derivation process.

Backward VSP may be enabled in 3D-HEVC. In 3D-HEVC, when a video coder applies a texture-first coding order, the video coder may derive, for each PU, a disparity vector from the NBDV derivation process with or without consideration of the depth values in a reference depth view. After the video coder obtains a disparity vector, the video coder may further refine the disparity vector for each 4×4 sub-region of one PU if the 4×4 sub-region of the PU is coded with BVSP mode.

The refinement process may include two steps. In the first step, the video coder may select one maximum depth value from a 4×4 depth block in the reference depth view. The video coder may use the derived disparity vector to locate the 4×4 depth block. In the second step, the video coder may convert the depth value to a horizontal component of the refined disparity vector while keeping the vertical component of the refined disparity vector to be 0. After the disparity vector is refined for one 4×4 sub-region of one PU, the video coder may use the refined disparity vector to locate one block in the reference texture view for motion compensation.

As indicated above, 3D-HEVC may use an NBDV derivation process to derive disparity vectors. U.S. Provisional Patent Application No. 61/769,716, filed Feb. 26, 2013, hereinafter the '716 application, which is incorporated by reference herein, describes an NBDV derivation process for 3D-AVC. As described in the '716 application, a video coder may use an MB-level NBDV derivation process to derive a disparity vector for a current MB. The video coder may further use the disparity vector for the current MB for motion vector prediction. As described in the '716 application, once the video coder identifies a disparity motion vector (i.e., once the video coder identifies a temporal or spatial neighboring block that uses an inter-view reference picture), the video coder may return the disparity motion vector as the disparity vector for the current MB.

Figure 5:
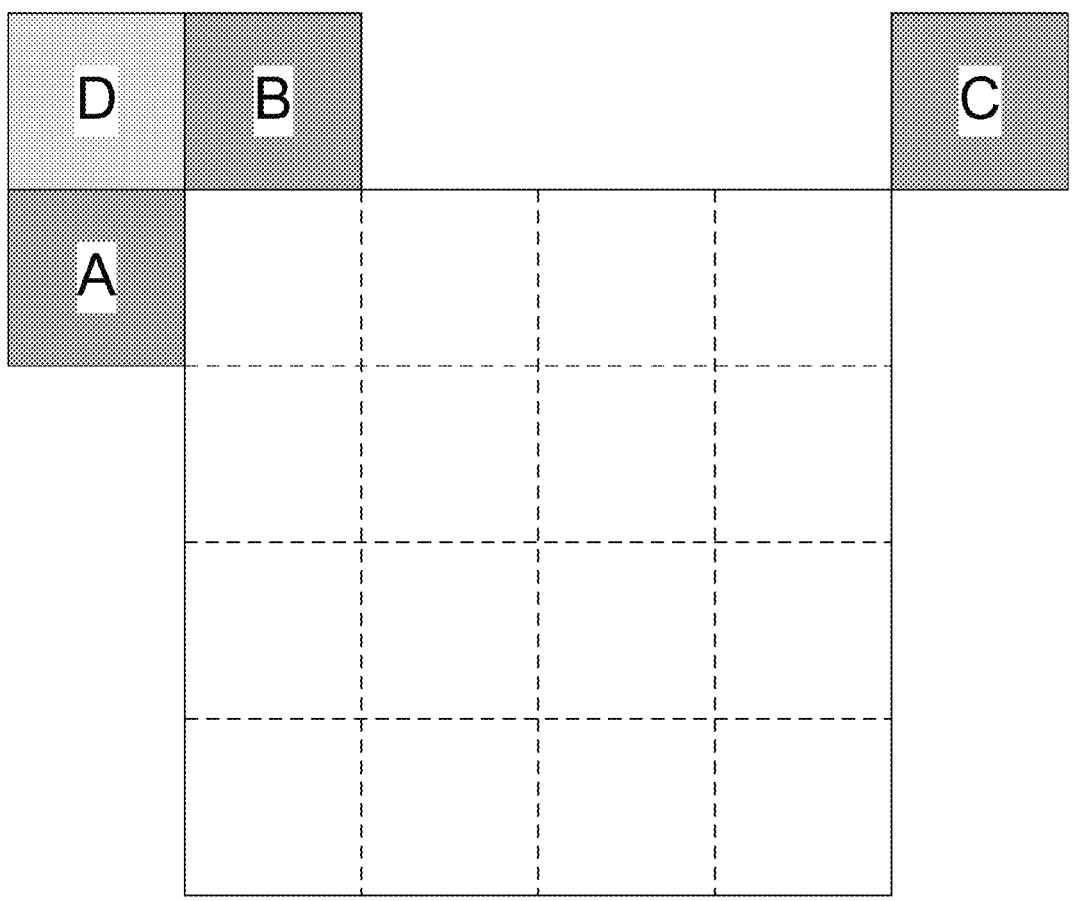
FIG. 5 is a conceptual diagram illustrating example spatial neighboring blocks for a neighboring block-based disparity vector (NBDV) derivation process.

FIG. 5 is a conceptual diagram illustrating example spatial neighboring blocks for an NBDV derivation process. In the '716 application, when a video coder checks spatial neighboring blocks in the NBDV derivation process, the video coder may check the spatial neighboring blocks that the video coder checks in the AVC motion prediction process. When the video coder checks the spatial neighboring blocks in the NBDV derivation process proposed in the '716 application, the video coder may check the spatial neighboring blocks in the order of A (left), B (above), C (above-right) and D (above-left), as shown in the example of FIG. 5. In other words, the spatial neighboring blocks that will be checked in AVC motion prediction process are checked in the order of A (left), B (above), C (above-right) and D (above-left) in the proposed NBDV process.

Figure 6:
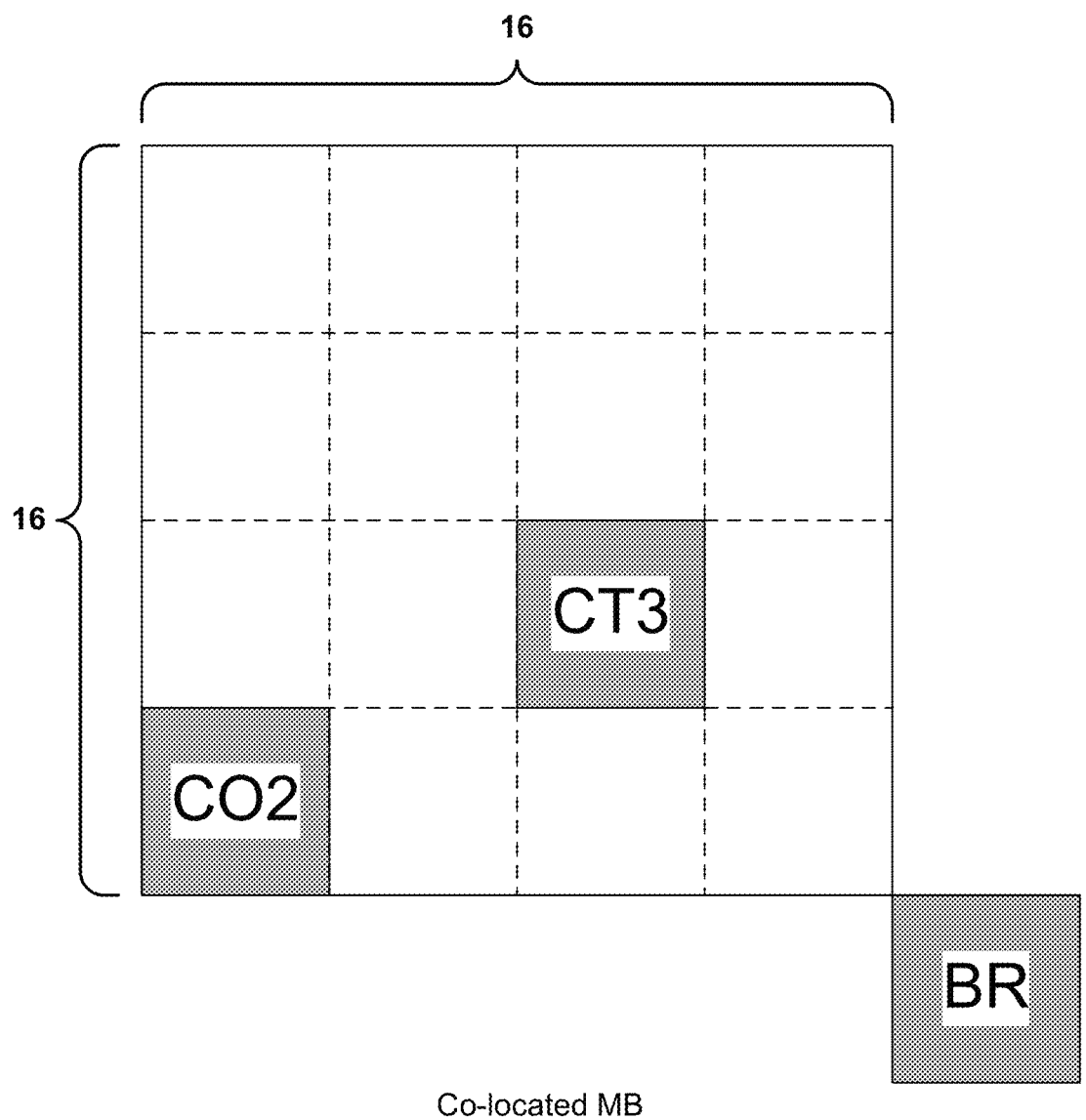
FIG. 6 is a conceptual diagram illustrating example temporal neighboring blocks for an NBDV derivation process.

Furthermore, in the NBDV derivation process proposed in the '716 application, the video coder may check temporal neighboring blocks. FIG. 6 is a conceptual diagram illustrating example temporal neighboring blocks for an NBDV derivation process. The video coder may check blocks from up to two reference pictures in the same view as the current picture: (RefPicList1[0] and RefPicList0[0] for B slices and RefPicList0[0] for P slices). Currently, the video coder may check three temporal blocks picture-by-picture. For each picture, the video coder may check the co-located blocks relative to the co-located MB as indicated below in order of BR (bottom-right), CT3 (center 3) and CO2 (corner 2), as indicated in the example of FIG. 6.

Furthermore, in the '716 application, the termination of the NBDV derivation process is described as follows. The video coder may check the above-mentioned neighboring blocks in order. Similar to 3D-HEVC, the video coder may check temporal neighboring blocks first and may check the spatial neighboring blocks afterwards. Once the video coder determines that a block contains an available disparity motion vector, the video coder may terminate the derivation process.

The coding gain of the method proposed in the '716 application, when compared with MVC+D, is shown in the following table.

|  | Texture Coding | | Depth Coding | | Total (Coded PSNR) | | Total (Synthesed PSNR) | |
| --- | --- | --- | --- | --- | --- | --- | --- | --- |
|  | dBR, % | dPSNR, dB | dBR, % | dPSNR, dB | dBR, % | dPSNR, dB | dBR, % | dPSNR, dB |
| S01 | 27.67 | −0.83 | −3.83 | 0.20 | 33.18 | −0.98 | 32.82 | −0.99 |
| S02 | 7.95 | −0.23 | −15.22 | 0.68 | 12.20 | −0.35 | 11.49 | −0.34 |
| S03 | 16.99 | −0.55 | −20.91 | 1.85 | 15.99 | −0.53 | 20.24 | −0.60 |
| S04 | 19.99 | −0.67 | −21.22 | 1.43 | 25.03 | −0.83 | 20.34 | −0.64 |
| S05 | 22.77 | −1.03 | −22.40 | 1.30 | 44.49 | −1.78 | 39.03 | −1.45 |
| S06 | 29.93 | −1.36 | −15.42 | 0.75 | 43.01 | −1.80 | 36.11 | −1.44 |
| S08 | 13.15 | −0.54 | −11.16 | 0.49 | 19.79 | −0.77 | 18.82 | −0.63 |
| Average | 19.78 | −0.74 | −15.74 | 0.96 | 27.67 | −1.01 | 25.55 | −0.87 |

The proposed method of the '716 application enables texture-only coding, which is not efficiently supported in 3D-AVC. When enabling the same texture-only configuration, the coding gain from of the current 3D-AVC is only 1%.

In some examples, an NBDV derivation process that accesses a depth view component of a reference view is used in 3D-AVC. As described in U.S. Provisional Patent Application 61/770,268 (the '268 application), filed Feb. 27, 2013, the entire content of which is incorporated herein by reference, the NBDV derivation process can be further improved by accessing the depth view component of a base/reference view. As described in the '268 application, a video coder may use the disparity vector derived from the neighboring blocks to locate depth pixels in the depth view component, such that the video coder can further refine the disparity vector. The following table shows a coding gain of the proposed method of the '268 application when compared with MVC+D.

ing the IDVs as in 3D-HEVC. However, the use of such IDVs may require additional storage for both the spatial neighboring blocks and temporal neighboring blocks. The storage of IDVs for spatial and temporal neighboring blocks may require significantly more storage in a level similar to the size of the motion field and more memory accesses.

This disclosure proposes an improved NBDV process. Specifically, the techniques of this disclosure may provide solutions to improve NBDV generation (i.e., the NBDV derivation process) by storing one or more derived disparity vectors (DDVs) for a whole slice. The techniques of this disclosure may be mainly designed for NBDV methods as described in the '716 application and the '268 application.

In accordance with one or more techniques of this disclosure, a video coder (e.g., video encoder 20 or video decoder 30) may store one or more DDVs. The video coder may use the DDVs for predicting disparity vectors of subsequently coded video blocks. In other words, one or more DDVs from the previous blocks are stored for better predicting of the disparity vector of future blocks.

In some examples, the video coder does not use a DDV to predict a disparity vector of a current block if the current block is a depth view component and the block from which the video coder derived the DDV is a texture view component. Moreover, the video coder does not use a DDV to

|  | Texture Coding | | Depth Coding | | Total (Coded PSNR) | | Total (Synthesed PSNR) | |
| --- | --- | --- | --- | --- | --- | --- | --- | --- |
|  | dBR, % | dPSNR, dB | dBR, % | dPSNR, dB | dBR, % | dPSNR, dB | dBR, % | dPSNR, dB |
| S01 | 40.61 | −1.09 | −4.43 | 0.23 | 45.32 | −1.22 | 43.63 | −1.20 |
| S02 | 12.89 | −0.36 | −18.08 | 0.83 | 16.61 | −0.46 | 14.90 | −0.43 |
| S03 | 22.07 | −0.69 | −25.71 | 2.40 | 20.22 | −0.65 | 23.97 | −0.69 |
| S04 | 28.87 | −0.93 | −27.45 | 1.90 | 33.30 | −1.06 | 26.72 | −0.81 |
| S05 | 28.47 | −1.22 | −22.69 | 1.33 | 49.34 | −1.89 | 44.42 | −1.58 |
| S06 | 35.69 | −1.56 | −16.56 | 0.81 | 48.32 | −1.97 | 40.81 | −1.58 |
| S08 | 16.48 | −0.66 | −11.57 | 0.51 | 22.51 | −0.85 | 21.52 | −0.70 |
| Average | 26.44 | −0.93 | −18.07 | 1.14 | 33.66 | −1.16 | 30.85 | −1.00 |

As shown above, the proposed method of the '268 application provides 5% more coding gain, although accessing the depth view component is still required.

The NBDV derivation methods developed for 3D-AVC may have the following problems. First, when utilizing the NBDV derivation method proposed in the '716 application, coding tools including D-MVP and BVSP may become less efficient, mainly due to the reason that the disparity vectors are not accurate enough. Second, when utilizing the NBDV derivation method proposed in the '268 application, accessing a depth view component is always required. Even in this case, the initial disparity vector obtained from the neighboring blocks might also prevent the video coder from identifying a more accurate area in the depth view component. Third, a disparity vector might be improved by access-predict a disparity vector of a current block if the current block is a texture view component and the block from which the video coder derived the DDV is a depth view component. For instance, a DDV is not used to predict a disparity vector of any block of any view component that is different from the view component which does not contain the current MB. In other words, a DDV is not used to predict a disparity vector of any block of any view component that does not contain the current MB.

Furthermore, in some examples, the video coder does not use a DDV to predict a disparity vector of a current block if the current block and the block from which the video coder derived the DDV are in different slices. For instance, a DDV is not used to predict a disparity vector of any block of any slice that is different from the slice which does not contain the current MB.

As indicated above, the video coder may maintain one or more DDVs for a slice. In some examples, the number of DDVs maintained for the slice by the video coder is not proportional to the width of a current picture, the height of the current picture, or the number of blocks in a current slice. In other words, the number of DDVs to be maintained is not proportional to the picture width, picture height or the number of blocks a slice has. Rather, in some examples, the number of the DDVs maintained by the video coder is proportional to the number of blocks in one MB, one CU, or one LCU.

In some examples of this disclosure, the video coder only stores one DDV. For instance, once the video coder codes the first (in coding order) MB of a slice, the video coder may store the disparity vector of the MB to the DDV. When coding the current MB, the video coder may use the stored DDV in an NBDV derivation process to derive a disparity vector for a subsequent MB. In other words, when coding the current MB, the DDV which is previously stored, generated when coding the previous MB (which typically is the left MB), is used for NBDV.

In this way, a video coder may, in some examples, store a DDV for a slice of a current picture of the video data. Furthermore, the video coder may derive, based at least in part on a DDV for a slice of a current picture of the video data, an NBDV for a first block of the slice. The video coder may code the first block based at least in part on the NBDV for the first block. Furthermore, the video coder may store the NBDV for the first block as the DDV. For instance, once (i.e., after) the video coder codes the first MB of the slice, the video coder may store the disparity vector of the MB as the DDV. Thus, in some examples, the video coder may store only one DDV for a slice of a current picture of the video data, wherein the slice includes multiple blocks. Furthermore, in such examples, the video coder may use the DDV for the slice in an NBDV derivation process to determine a disparity vector for a particular block, wherein the particular block is one of the blocks of the slice. In such examples, the video coder may store, as the DDV for the slice, the disparity vector for the particular block After storing the NBDV for the first block as the DDV, the video coder may derive, based at least in part on the DDV, an NBDV for a second block of the slice. In some examples, the first block is immediately to the left of the second block. Furthermore, the video coder may code the second block based at least in part on the NBDV for the second block. In such examples, the first block may be a macroblock and the second block may also be a macroblock. In other instances, the first block and the second block may be CUs, the first block and the second block may be PUs, or the first block and the second block may be LCUs.

In some examples, the video coder may update the DDV to specify the disparity vector of the current MB. For instance, the video coder may update the DDV to specify the disparity vector of the current MB only when the video coder codes the current MB using inter-view motion prediction. In other words, the DDV is only updated when the current MB is coded by using the NBDV result, e.g., using inter-view motion prediction. In another example, the video coder only updates the DDV to specify the disparity vector of the current MB when the current MB is inter coded. In other words, the DDV is only updated when the current MB is inter coded. In another example, the video coder only updates the DDV to specify the disparity vector of the current MB when the current MB is in an inter coded slice (e.g., a P slice or a B slice). Thus, in this example, the DDV is only updated when the current slice is inter coded. In another example, the video coder only updates the DDV to specify the disparity vector of the current MB when the current MB is coded with skip mode or direct mode. In other words, the DDV is only updated when the current MB is coded with skip mode or direct mode.

Furthermore, in some examples, the video coder may store a disparity vector for a block as the DDV in response to determining that a magnitude of the disparity vector for the block is larger than a magnitude of the DDV. For instance, the video coder may update the DDV to specify the disparity vector of the current MB only if a horizontal component of the disparity vector of the current MB is larger than a horizontal component of the DDV. In other words, the DDV is only further stored/updated if the derived disparity vector of the current MB is larger than the previously stored DDV. Here, the absolute value of the horizontal component of the disparity vector is compared.

In some examples, the video coder updates the DDV to specify the disparity vector of a current block only if the DDV is zero. In some examples, the video coder may identify the DDV as being zero when both components of the DDV are equal to zero. In other examples, the video coder may identify the DDV as being zero when the horizontal component of the DDV is equal to zero. Hence, in such examples, the DDV is only further stored or updated if the DDV is zero (identified by both components being zero or just the horizontal component being zero).

In some examples, a video coder may derive a disparity vector for a current block from a stored DDV only when the stored DDV specifies a disparity vector for a block to the left of the current block. For instance, if an MB from which the video coder derived a DDV is not adjacent to the left side of a current MB, the video coder does not use the DDV to derive a disparity vector for the current MB. In other words, if the previous MB used to generate the DDV is not the MB located at the left side of the current MB, the DDV is not used to derive the NBDV of the current MB.

Thus, in the various examples of this disclosure provided above and elsewhere in this disclosure, the video coder may update a DDV to specify the NBDV for a block responsive to a condition being satisfied, the condition being one of: the first block is coded using inter-view motion prediction, the first block is inter coded, the slice is inter coded, the first block is coded with skip mode or direct mode, a magnitude of the NBDV for the first block is larger than a magnitude of the DDV, and the DDV is non-zero.

A video coder may derive the NBDV for the current block based at least in part on a stored DDV, disparity motion vectors for temporal neighboring blocks (TDVs) and disparity motion vectors for spatial neighboring blocks (SDVs). That is, the DDV can be used together with the possible disparity motion vectors from the temporal neighboring blocks (denoted as TDVs) and disparity motion vectors from the spatial neighboring blocks (denoted as SDVs) in various ways. Hence, deriving the NBDV for a first block may comprise using the DDV, a disparity motion vector for a temporal neighboring block, and a disparity motion vector for a spatial neighboring block to derive the NBDV for the block.

For example, the video coder may set the disparity vector of the current block as the DDV when the video coder is unable to identify any TDVs or SDVs. In other words, after no available TDVs or SDVs are identified, the disparity vector is set to DDV. Thus, in response to determining that none of the TDVs or SDVs is available for use in determining an NBDV for a current block, the video coder may determine that the NBDV for the current block is equal to the stored DDV.

In some examples, the video coder only sets the disparity vector for the current block as the DDV if there are no available TDVs or SDVs and the DDV is non-zero. The video coder may determine that the DDV is non-zero when either of the components of the DDV is non-zero. Alternatively, the video coder may determine that the DDV is non-zero when the horizontal component of the DDV is non-zero. In this example, the video coder may set the disparity vector for the current block to zero if the DDV is zero. In other words, when the temporal and spatial neighbors do not provide an available disparity motion vector, if the DDV is non-zero (identified by both components being zero or just the horizontal component being zero), the non-zero DDV is returned as NBDV; otherwise, a zero disparity vector is returned.

Furthermore, in some examples where the video coder performs an NBDV derivation process that checks TDVs and SDVs in addition to checking a DDV, the video coder may check the TDVs, SDVs, and the DDV in various orders. In other words, the disparity vectors are checked in a given pre-defined order. Once the video coder identifies a disparity motion vector that is available and that is non-zero (identified by both components being non-zero or just the horizontal component being non-zero), the video coder may derive the disparity vector of the current block from the identified disparity motion vector. For instance, when the video coder identifies an available non-zero disparity motion vector from among the stored DDV, the TDVs, and the SDVs while checking the stored DDV, the TDVs and the SDVs in a predefined order, a video coder may determine that a disparity vector for a current block is equal to the available non-zero disparity vector. Possible pre-defined checking orders may include:

TDVs, SDVs and DDV;
SDVs, TDVs and DDV;
DDV, SDVs, and TDVs;
DDV, TDVs, and SDVs;
TDVs, DDV, and SDVs; and
SDVs, DDV, and TDVs.

For instance, if the video coder uses the order of TDVs, SDVs and DDV or SDVs, TDVs, and DDV, deriving the NBDV for a block may comprise setting the NBDV for the block as the DDV after determining that the temporal neighboring block does not have a disparity motion vector and after determining that the spatial neighboring block does not have a disparity motion vector.

More specifically, if the video coder uses the order of TDVs, SDVs and DDV, the video coder may determine whether a temporal neighboring block has a disparity motion vector. Furthermore, responsive to determining that the temporal neighboring block has a disparity motion vector, the video coder may derive the NBDV for the block based on the disparity motion vector of the temporal neighboring block. Responsive to determining that the temporal neighboring block does not have a disparity motion vector, the video coder may determine whether any spatial neighboring block in a plurality of spatial neighboring blocks has a disparity motion vector. Responsive to determining a particular spatial neighboring block in the plurality of spatial neighboring blocks has a disparity motion vector, the video coder may derive the NBDV for the block based on the disparity motion vector of the particular spatial neighboring block. Responsive to determining that no spatial neighboring block in the plurality of spatial neighboring blocks has a disparity motion vector, the video coder may derive the NBDV for the block as the DDV.

In some examples, the video coder derives two or more DDVs. In such examples, the video coder may form the DDVs in a certain order. In some such examples, the video coder may jointly consider the DDVs with TDVs and SDVs in the same pre-defined order as described in the examples above where the video coder performs an NBDV derivation process that checks TDVs and SDVs in addition to checking a DDV, by replaying the only DDV with multiple DDVs. For instance, when an available non-zero disparity vector is identified from among TDVs, SDVs, and the two or more stored DDVs while checking the TDVs, the SDVs, and the two or more stored DDVs in a predefined checking order, a video coder may determine that a disparity vector for a current block is equal to the available non-zero disparity vector, wherein in the predefined checking order the two or more stored DDVs are checked according to the particular order.

In some examples where the video coder derives two or more DDVs, if a DDV is not generated from a neighboring MB of the current block, the DDV is excluded from the DDVs used to predict the disparity vector of the current MB.

Furthermore, in some examples, the video coder derives two DDVs: DDV 1 and DDV 2. DDV 1 and DDV 2 may be initially set to be the same. However, DDV 1 is updated once the current MB, which is the right neighboring MB the current MB is coded and DDV 2 is updated once the current MB, which is the above neighboring MB of the current MB is coded. That is, DDV 1 is updated once the current MB is coded as a right neighboring MB of the previously consecutively coded MB and DDV 2 is updated once the current MB is coded as the bottom neighboring MB of the previously consecutively coded MB. When the video coder codes a current MB, the video coder may code both DDV 1 and DDV 2, with DDV 1 having higher priority than the DDV 2. In other words, the video coder checks DDV 1 earlier than DDV 2. In another example, the video coder only uses DDV 1 to derive the disparity vector of the current block if DDV 1 is derived from the block to the left of the current block. For instance, only if DDV 1 is derived from the left neighboring MB, DDV 1 is used to derive the disparity vector. In addition, the video coder may use DDV 2 to derive the disparity vector for a current block if DDV 2 is derived from the block that is above the current block. For instance, if DDV 2 is derived from the above neighboring MB, DDV 2 is used to derive the disparity vector.

In some examples, when accessing a base/reference view depth view component is allowed, two or more alternative approaches are possible in terms of using the DDV. In one approach, the video coder only uses the DDV when accessing the depth view component is disallowed. For instance, in response to determining that accessing a depth view component is disallowed, the video coder may derive, based on one or more stored DDVs, a disparity vector for a current block.

In another example where accessing a base/reference view depth view component is allowed, the video coder uses the DDV to determine an initial disparity vector described as above. Afterwards, the video coder further uses the initial disparity vector to identify a potentially more accurate depth block to refine the disparity motion vector. For example, when accessing a base/reference view depth view component is allowed, the video coder may determine, based on one or more stored DDVs, an initial NBDV for the current block and may use the initial disparity vector for the current block to identify a potentially more accurate depth block to refine the initial disparity vector for the current block.

Furthermore, in some examples where accessing a base/reference view depth view component is allowed, a video coder may improve a DDV by using the refined disparity vector as described in the '268 application. For instance, when accessing a base/reference view depth view component is allowed, a video coder may refine the one or more stored DDVs. In some examples, the video coder stores the disparity vector refined in the MB level as the DDV. In another example, the video coder stores the disparity vector refined in a block level smaller than the MB level as the DDV. For instance, the video coder may store the refined disparity vector of the bottom-right corner within the MB as the DDV. In this way, the video coder may refine, based on depth pixels in a depth view component, the NBDV for a block and when the video coder stores the NBDV for the block as the DDV, the video coder may update the DDV to specify the refined NBDV for the block.

The following is a generalization of the proposed techniques (e.g., methods) of this disclosure to 3D-HEVC. In a first point of a generalization of the proposed techniques to 3D-HEVC, the above-described techniques of this disclosure may also be applied to 3D-HEVC with MBs replaced by PUs, CUs, or LCUs. In a second point of a generalization of the proposed techniques of this disclosure to 3D-HEVC, when the proposed techniques of this disclosure are used in 3D-HEVC, video coders may not need to store IDVs. In other words, in 3D-AVC, 3D-HEVC, and potentially other video coding standards and specifications, the video coder may not, in accordance with some examples of this disclosure, store IDVs for any block of the slice.

In a third point of a generalization of the proposed techniques to 3D-HEVC, for each LCU or CU, a video coder may store DDVs of the right-most blocks in a unit larger or equal to the smallest coding unit (e.g., 4×4 or 8×8). When coding a current PU, the video coder may use the DDVs that the video coder derived from the left blocks of the current PU of the left LCU to predict the disparity vector of the current PU. For example, when the LCU is 64×64 and the smallest coding unit is 4×4, the video coder may store up to 16 DDVs. Some of the stored DDVs might be the same, because the stored DDVs belong to the blocks of the same PU.

Furthermore, for a LCU or CU, the video coder may only store one DDV derived from one of the PUs within the LCU or CU. When coding a current PU, the video coder may use the DDV of the left LCU/CU of the current PU to predict the disparity vector of the current PU. In one example, the video coder may select the DDV of one LCU or CU to be stored via a function of all available DDVs of PUs within the LCU or CU.

In this way, video encoder 20 may store one or more DDVs from one or more previously-coded blocks of a slice. Furthermore, video encoder 20 may derive, based on the one or more stored DDVs, an NBDV for a current block of the slice. Video encoder 20 may encode the current block based at least in part on the NBDV for the current block. Similarly, video decoder 20 may store one or more DDVs from one or more previously-coded blocks of a slice. Furthermore, video decoder 20 may derive, based at least in part on the one or more stored DDVs, an NBDV for a current block of the slice. Video decoder 30 may decode the current block based at least in part on the NBDV for the current block.

In another point of a generalization of the proposed techniques of this disclosure to 3D-HEVC, the video coder may only maintain one DDV for each slice. The video coder may update the DDV once a CU is coded. In different examples, the video coder may update the DDV in different ways.

For example, when a slice is not intra coded, the video coder may invoke the NBDV derivation process for each CU, regardless whether the CU uses a disparity vector resulting from the NBDV derivation process. In other words, once a slice is not intra coded, NBDV is invoked for each CU regardless whether the CU uses the NBDV result or not. The video coder may use the NBDV result to update the DDV, meaning that the video coder may set the DDV to be equal to the disparity vector derived by the NBDV derivation process.

In another example of how a video coder may update a DDV when the techniques of this disclosure are generalized to 3D-HEVC, the video coder may invoke an NBDV derivation process after the video coder uses inter prediction to code a CU. In other words, once a CU is inter coded, NBDV is invoked for the CU. The video coder may use the NBDV result (i.e., the disparity vector derived by the NBDV derivation process) to update the DDV. Otherwise, if the video coder does not use inter prediction to code the CU, the video coder does not update the DDV.

In another example of how a video coder may update a DDV when the techniques of this disclosure are generalized to 3D-HEVC, the video coder may update the DDV using an NBDV result (i.e., a disparity vector derived by an NBDV derivation process) when the video coder codes a PU within a CU using the NBDV result. In this example, the video coder does not update the DDV when the video coder codes a PU without using the NBDV result. In other words, once a PU within a CU is coded using the NBDV result, the NBDV result is used to update the DDV, otherwise the DDV is not updated.

In another example of how a video coder may update a DDV when the techniques of this disclosure are generalized to 3D-HEVC, the video coder may update the DDV to specify an NBDV result (i.e., a disparity vector derived by an NBDV derivation process) when the video coder codes at least one PU of a CU with skip mode. In other words, in this example, once at least one PU within a CU is coded with skip mode, the NBDV result is used to update the DDV.

In another example point of a generalization of the proposed techniques of this disclosure to 3D-HEVC, the video coder may, in some examples, only maintain one DDV for each slice and the video coder may only update the DDV once a PU is coded. Thus, in various examples of this disclosure, only one DDV is maintained for the slice and the DDV is updated once for each block (a macroblock, CU, PU, etc.) of the slice that is coded after the first block of the slice of the slice is coded. In some examples, the video coder may update the DDV in various ways. For example, the video coder may invoke an NBDV derivation process for each respective PU of a slice when the slice is not intra coded, regardless of whether the video coder uses an NBDV result to code the respective PU. In this example, the video coder may use the NBDV result to update the DDV. In other words, once a slice is not intra coded, NBDV is invoked for each PU regardless whether the PU uses the NBDV result or not.

In another example of how a video coder may update a DDV when the video coder maintains only one DDV for each slice, the video coder may invoke an NBDV derivation process if the video coder has used inter prediction to code a PU. In this example, the video coder may use the NBDV result to update the DDV. Otherwise, if the video coder did not use inter prediction to code the PU, the video coder does not use the NBDV result to update the DDV. In other words, once a PU is inter coded, NBDV is invoked for the PU. The NBDV result is used to update the DDV, otherwise the DDV is not updated.

In another example of how a video coder may update a DDV when the video coder maintains only one DDV for each slice, the video coder may use an NBDV result to update the DDV when the video coder codes a PU using the NBDV result. In this example, the video coder does not use the NBDV result to update the DDV when the video coder does not code the PU using the NBDV result. In other words, once a PU is coded using the NBDV result, the NBDV result is used to update the DDV, otherwise the DDV is not updated.

In another example of how a video coder may update a DDV when the video coder maintains only one DDV for each slice, the video coder may use an NBDV result to update the DDV when the video coder uses skip mode to code a PU. In other words, once a PU is coded with skip mode, the NBDV result is used to update the DDV.

In some examples where the techniques of this disclosure are generalized to 3D-HEVC, a video coder maintains one DDV for each slice, and the video coder updates the DDV once the video coder codes a CU is coded or once the video coder codes a PU, the video coder may use the DDV to derive the disparity vector of a block (i.e., the NBDV) when spatial and temporal neighboring blocks of the block do not have disparity motion vectors. In other words, the DDV is used to derive the NBDV when spatial and temporal neighboring blocks do not contain a disparity motion vector. In this case, the video coder may set the NBDV to be equal as the DDV. Afterwards, the video coder may further refine the NBDV, which is set as the DDV, by accessing the depth of the reference view. In some examples, the video coder may set the DDV equal to the refined disparity vector that results from accessing a depth view component of a reference view using the original NBDV (i.e., the unrefined disparity vector of the block).

Furthermore, in some examples where the techniques of this disclosure are applied to either 3D-AVC or 3D-HEVC, the video coder may only store and update the horizontal component of DDVs while the video coder may always set the vertical component of DDVs to 0.

One or more example techniques of this disclosure may be generalized to any video codec. For instance, a variable may be derived for each block. The variable is used and necessary for decoding the current block. The variable may be updated after each block is decoded. The variable as may be updated by the previous block is carried to predict the current block. The variable is only predicted from the neighboring blocks and is not directly or indirectly (e.g., using differential coding) signaled.

Figure 7:
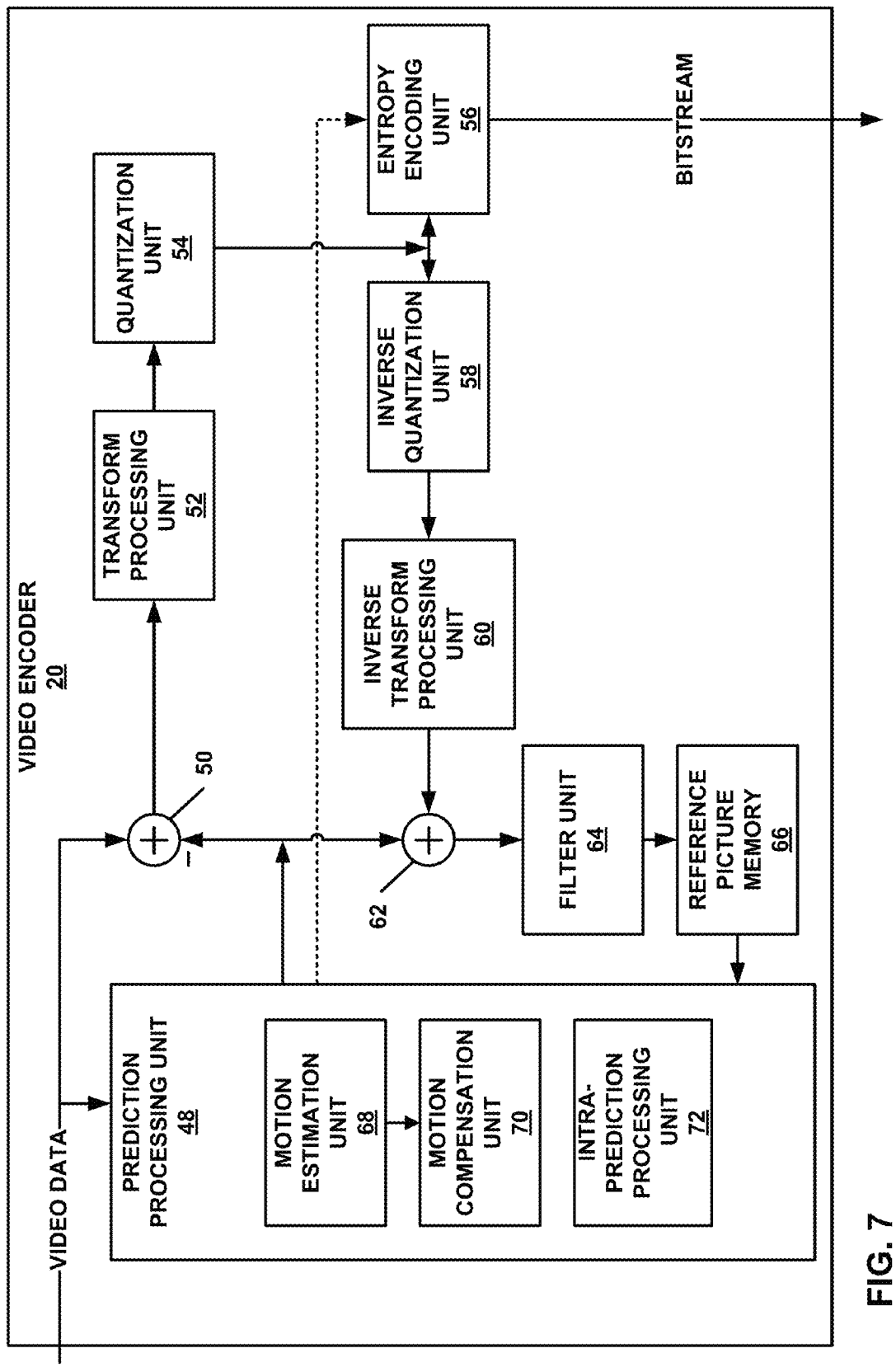
FIG. 7 is a block diagram illustrating an example video encoder that may implement one or more techniques of this disclosure.

FIG. 7 is a block diagram illustrating an example video encoder 20 that may implement one or more techniques of this disclosure. In the example of FIG. 7, video encoder 20 includes a prediction processing unit 48, a summer 50, a transform processing unit 52, a quantization unit 54, an entropy encoding unit 56, an inverse quantization unit 58, an inverse transform processing unit 60, a summer 62, a filter unit 64, and a reference picture memory 66. Prediction processing unit 48 includes a motion estimation unit 68 (i.e., a motion and disparity compensation unit), a motion compensation unit 70 (i.e., a motion and disparity compensation unit), and an intra prediction processing unit 72.

As shown in FIG. 7, video encoder 20 receives video data, and partitions the data into video blocks. This partitioning may also include partitioning pictures into slices, tiles, or other larger units, as well as video block partitioning, e.g., according to a quadtree structure of LCUs and CUs or by partitioning macroblocks in the case of HEVC. Video encoder 20 generally illustrates the components that encode video blocks within a slice to be encoded. The slice may be divided into multiple video blocks (and possibly into sets of video blocks referred to as tiles).

Prediction processing unit 48 may select one of a plurality of possible coding modes, such as one of a plurality of intra coding modes or one of a plurality of inter coding modes or inter-view coding modes, for the current video block based on error results (e.g., coding rate and the level of distortion). Prediction processing unit 48 may perform intra- and inter-coding of video blocks within slices. Inter-coding (i.e., temporal inter prediction) may rely on temporal prediction to reduce or remove temporal redundancy in video within adjacent frames or pictures of a video sequence. Intra-coding (i.e, "intra-mode" or "I mode") may refer to any of several spatial based compression modes. Inter-modes, such as uni-directional prediction (i.e., "uni-prediction" or "P mode") or bi-directional prediction (i.e., "bi-prediction" or "B mode") may refer to any of several temporal-based compression modes. In addition, prediction processing unit 48 may perform inter-view prediction between pictures in different views, as described above. Prediction processing unit 48 may provide the resulting intra- or inter-coded block to summer 50 to generate residual block data and to summer 62 to reconstruct the original block for use as a reference picture.

Intra prediction processing unit 72 within prediction processing unit 48 may perform intra-predictive coding (i.e., intra coding) of the current video block relative to one or more neighboring blocks in the same frame or slice as the current block to be coded to provide spatial compression. In other words, intra-coding relies on spatial prediction to reduce or remove spatial redundancy in video within a given video frame or picture. Motion estimation unit 68 and motion compensation unit 70 within prediction processing unit 48 perform inter-predictive coding and/or inter-view coding of the current video block relative to one or more predictive blocks in one or more reference pictures and/or reference views to provide temporal and inter-view compression.

Prediction processing unit 48 may determine the inter-prediction mode and/or inter-view prediction mode for a slice according to a predetermined pattern for a video sequence. The predetermined pattern may designate slices in the sequence as P slices or B slices. Motion estimation unit 68 and motion compensation unit 70 may be highly integrated, but are illustrated separately for conceptual purposes. Motion estimation unit 68 may perform motion estimation and/or disparity estimation. Motion estimation comprises the process of generating motion vectors, which estimate motion for video blocks. A motion vector, for example, may indicate the displacement of a current block (e.g., a PU, MB, MB partition, etc.) within a current video frame or picture relative to a predictive block within a reference picture. Disparity estimation is the process of generating disparity vectors, which may be used to predict a currently coded block from a block in a different view.

A predictive block may be a block that is found to closely match a current block (e.g., PU, MB, MB partition, etc.) to be coded in terms of pixel difference, which may be determined by a sum of absolute difference (SAD), a sum of square difference (SSD), or other difference metrics. In some examples, video encoder 20 may calculate values for sub-integer pixel positions of reference pictures stored in reference picture memory 66. Reference picture memory 66 may also be referred to as a decoded picture buffer. For example, video encoder 20 may interpolate values of one-quarter pixel positions, one-eighth pixel positions, or other fractional pixel positions of the reference picture. Therefore, motion estimation unit 68 may perform a motion search relative to the full pixel positions and fractional pixel positions and output a motion vector with fractional pixel precision.

Prediction processing unit 48 may calculate a motion vector (for motion compensated prediction) and/or a disparity vector (for disparity compensated prediction) for a block (e.g. a PU, MB, MB partition, etc.) in an inter-coded or inter-view predicted slice by comparing the position of the block to the position of a predictive block of a reference picture. The reference picture may be selected from a first reference picture list (List 0) or a second reference picture list (List 1), each of which identify one or more reference pictures stored in reference picture memory 66. For inter-view prediction, the reference picture is in a different view. Motion estimation unit 68 may send the calculated motion vector and/or disparity vector to entropy encoding unit 56 and motion compensation unit 70.

Motion compensation unit 70 may perform motion compensation and/or disparity compensation. Motion compensation and/or disparity compensation may involve fetching or generating the predictive block based on the motion vector determined by motion estimation and/or disparity estimation, possibly performing interpolations to sub-pixel precision. Upon receiving the motion vector and/or disparity for a block (e.g. a PU, MB, MB partition, etc.), motion compensation unit 70 may locate the predictive block to which the motion vector and/or disparity vector points in one of the reference picture lists. Prediction processing unit 48 may also generate syntax elements associated with the video blocks and the slice for use by video decoder 30 in decoding the video blocks of the slice.

Summer 50 may form a residual video block by subtracting pixel values of the predictive block from corresponding pixel values of the current video block being coded, thereby forming pixel difference values. The pixel difference values form residual data for the current video block. The pixel difference values may include both luma difference values and chroma difference values. Summer 50 may represent the component or components that perform this subtraction operation.

Intra-prediction processing unit 72 may perform intra-prediction to generate one or more predictive blocks for a current video block, as an alternative to the inter-prediction performed by motion estimation unit 68 and motion compensation unit 70, as described above. For instance, intra-prediction processing unit 72 may determine an intra-prediction mode to use to generate the one or more predictive blocks for the current video block. After determining (i.e., selecting) an intra-prediction mode for a current video block, intra-prediction processing unit 72 may provide information (e.g., a syntax element) indicative of the selected intra-prediction mode for the current video block to entropy encoding unit 56. Entropy encoding unit 56 may encode the information indicating the selected intra-prediction mode.

In some examples, intra-prediction processing unit 72 may encode a current video block (i.e., intra-prediction processing unit 72 may generate one or more predictive blocks for the current video block) using various intra-prediction modes. For instance, intra-prediction processing unit 72 may generate predictive blocks for the current video block during separate encoding passes. Intra-prediction processing unit 72 may select an appropriate intra-prediction mode to use from the tested modes. For example, intra-prediction processing unit 72 may calculate rate-distortion values using a rate-distortion analysis for the various tested intra-prediction modes, and select the intra-prediction mode having the best rate-distortion characteristics among the tested intra-prediction modes. In general, a rate-distortion analysis determines an amount of distortion (or error) between an encoded block and an original, unencoded block that was encoded to produce the encoded block, as well as a bit rate (that is, a number of bits) used to produce the encoded block. Intra-prediction processing unit 72 may calculate ratios from the distortions and rates for the various encoded blocks to determine which intra-prediction mode exhibits the best rate-distortion value for the predictive block.

In some examples, motion estimation unit 68 may determine a disparity vector for the current video block. Motion estimation unit 68 may use the disparity vector for the current block to perform motion vector prediction for the current video block. For instance, motion estimation unit 68 may use the disparity vector for the current block to determine a corresponding block in an inter-view reference picture. In addition, motion estimation unit 68 may generate a motion vector candidate list (e.g., a merge candidate list or an AMVP candidate list) for the current video block. The motion vector candidate list may include one or more candidates that specify one or more motion vectors of the corresponding inter-view reference block. Motion compensation unit 70 may determine predictive blocks based on the candidates and may select one of the candidates based on a rate distortion analysis of the predictive blocks and other data. Motion compensation unit 70 may generate one or more syntax elements indicating the selected candidate. Furthermore, in some examples, motion compensation unit 70 may use the disparity vector for the current video block to perform residual prediction (e.g., Advanced Residual Prediction) for the current video block. Thus, in such examples, the predictive block ultimately generated by motion compensation unit 70 may be based on a difference between a predictive block for the current video block and a residual predictor for the current video block.

Motion estimation unit 68 may use an NBDV derivation process to determine the disparity vector for the current video block. In accordance with one or more techniques of this disclosure, motion estimation unit 68 may initialize one or more DDVs for the current slice. Motion estimation unit 68 may use the one or more DDVs for the current slice in the NBDV derivation process to determine the disparity vector for the current video block. In some examples, motion estimation unit 68 initializes a single DDV for the current slice and updates the DDV such that, for each respective video block of the current slice after the first video block of the current slice, the DDV for the current slice specifies the disparity vector for the video block that occurs immediately prior to the respective video block in coding order.

In this way, motion estimation unit 68 may store a DDV for a current slice of a current picture. Furthermore, motion estimation unit 68 may derive, based at least in part on the DDV, an NBDV for a first video block of the current slice. Motion compensation unit 70 and other units of video encoder 20 may encode the first video block based at least in part on the NBDV for the first video block. Furthermore, motion estimation unit 68 may store the NBDV for the first video block as the DDV, thereby updating the DDV. After storing the NBDV for the first video block as the DDV, motion estimation unit 68 may derive, based at least in part on the updated DDV, an NBDV for a second video block of the current slice. Motion compensation unit 70 and other units of video encoder 20 may encode the second video block based at least in part on the NBDV for the second video block. Motion estimation unit 68, motion compensation unit 70, and other units of video encoder 20 may continue performing these actions for additional video blocks of the current slice.

After prediction processing unit 48 generates a predictive block for a current video block via either inter-prediction or intra-prediction, summer 50 may form a residual block by subtracting sample values of the predictive block from corresponding sample values of the current video block. The residual video data in the residual block may be included in one or more TUs. Transform processing unit 52 may use a transform to transform the residual video data into residual transform coefficients. For instance, transform processing unit 52 may use a discrete cosine transform (DCT) or a conceptually similar transform to transform the residual video data. In some examples, transform processing unit 52 may convert the residual video data from a pixel domain to a transform domain, such as a frequency domain.

Transform processing unit 52 may send the resulting transform coefficients to quantization unit 54. Quantization unit 54 may quantize transform coefficients generated by transform processing unit 52 to further reduce bit rate. The quantization process may reduce the bit depth associated with some or all of the coefficients. The degree of quantization may be modified by adjusting a quantization parameter. In some examples, quantization unit 54 may perform a scan of the matrix including the quantized transform coefficients. Alternatively, entropy encoding unit 56 may perform the scan.

Following quantization, entropy encoding unit 56 may entropy encode the quantized transform coefficients. In other words, entropy encoding unit 56 may entropy encode syntax elements representing the quantized transform coefficients. For example, entropy encoding unit 56 may entropy encode the quantized transform coefficients by performing context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 56 may also entropy encode other syntax elements for the current slice being coded.

Video encoder 20 may output an encoded bitstream that includes an encoded representation of the video data. The bitstream may include entropy-encoded syntax elements generated by entropy encoding unit 56 and other entropy coded or non-entropy coded syntax elements. The encoded bitstream may be transmitted to video decoder 30 or archived for later transmission or retrieval by video decoder 30.

Inverse quantization unit 58 and inverse transform processing unit 60 may apply inverse quantization and inverse transformation, respectively, to reconstruct the residual block in the pixel domain for later use as a reference block of a reference picture. Summer 62 may reconstruct sample blocks by adding samples in residual blocks generated by inverse transform processing unit 60 to corresponding samples of one or more predictive blocks generated by prediction processing unit 48. In some examples, summer 62 adds the reconstructed residual block to a predictive block (e.g., a motion compensated predictive block produced by motion compensation unit 44) to produce a reference block for storage in reference picture memory 66. Thus, reference picture memory 66 may be a memory that stores video data.

Motion estimation unit 68 and motion compensation unit 70 may use the reference block as a reference block to inter-predict a block in a subsequent video frame or picture. Motion compensation unit 70 may calculate a reference block by adding the residual block to a predictive block of one of the reference pictures within one of the reference picture lists. Motion compensation unit 70 may also apply one or more interpolation filters to the reconstructed residual block to calculate sub-integer pixel values for use in motion estimation.

In the example of FIG. 7, filter unit 64 may apply one or more filters to the sample block generated by summer 62. For instance, filter unit 64 may apply a deblocking filter to filter block boundaries to remove blockiness artifacts from reconstructed video. In some examples, filter unit 64 uses additional loop filters (in loop or post loop) in addition to the deblocking filter.

Figure 8:
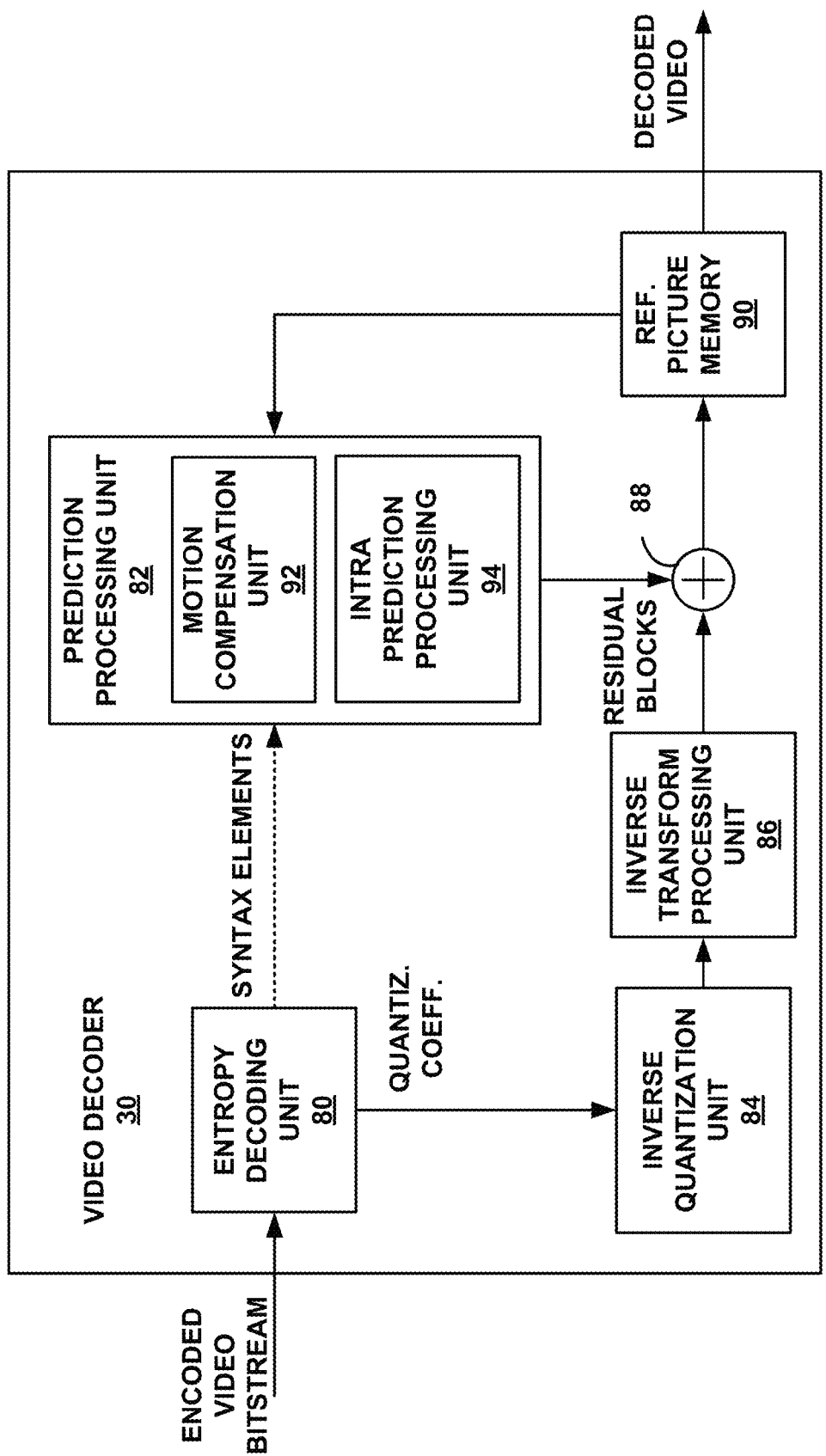
FIG. 8 is a block diagram illustrating an example video decoder that may implement one or more techniques of this disclosure.

FIG. 8 is a block diagram illustrating an example video decoder 30 that may implement one or more techniques of this disclosure. In the example of FIG. 8, video decoder 30 includes an entropy decoding unit 80, a prediction processing unit 82, an inverse quantization unit 84, an inverse transform processing unit 86, a summer 88, and a reference picture memory 90. Prediction processing unit 82 includes a motion compensation unit 92 (i.e., a motion and disparity compensation unit) and an intra prediction processing unit 94. In some examples, video decoder 30 may perform a decoding pass generally reciprocal to the encoding pass described with respect to video encoder 20 from FIG. 7.

Video decoder 30 receives an encoded video bitstream that represents video blocks of an encoded slice and associated syntax elements from video encoder 20. Entropy decoding unit 80 of video decoder 30 may entropy decode the bitstream to generate quantized coefficients, motion vectors, disparity vectors, and other syntax elements. More specifically, entropy decoding unit 80 may perform a parsing process to obtain syntax elements from the video bitstream. As part of performing the parsing process, entropy decoding unit 80 may entropy decode entropy-encoded syntax elements signaled in the video bitstream. Entropy decoding unit 80 may forward the syntax elements associated with motion vectors, disparity vectors, and other information to prediction processing unit 82. Video decoder 30 may receive the syntax elements at the slice level and/or the video block level.

When the current slice is coded as an intra-coded slice (e.g., an I slice, an SI slice, etc.), intra prediction processing unit 94 of prediction processing unit 82 may generate prediction data for a video block of the current slice based on a signaled intra prediction mode and data from previously decoded blocks of the current frame or picture. When the current slice is an inter-coded (e.g., a P slice, a B slice, an SP slice, etc.), motion compensation unit 92 of prediction processing unit 82 may produce (i.e., generate) predictive blocks for a video block of the current slice based on motion vectors, disparity vectors, and syntax elements received from entropy decoding unit 80.

Prediction processing unit 82 of video decoder 30 may construct reference frame lists, List 0 and List 1, using (e.g., default) construction techniques based on reference pictures stored in reference picture memory 90 (which is also referred to as a decoded picture buffer (DPB)). Motion compensation unit 92 may produce predictive blocks from one or more reference pictures within one or more of the reference picture lists.

Motion compensation unit 92 may determine prediction information for a video block of the current slice by parsing the motion vectors and other syntax elements, and may use the prediction information to produce the predictive blocks for the current video block being decoded. For example, motion compensation unit 92 may use some of the received syntax elements to determine a prediction mode (e.g., intra- or inter-prediction) to use to code the video blocks of the slice, syntax elements to determine an inter-prediction or inter-view prediction slice type (e.g., B slice, P slice, or GPB slice), syntax elements to determine construction information for one or more of the reference picture lists for the slice, syntax elements to determine motion vectors and/or disparity vectors for each inter-encoded video block of the slice, syntax elements to determine an inter-prediction status for each inter-coded video block of the slice, and syntax elements to determine other information to decode the video blocks in the current slice.

Motion compensation unit 92 may also perform interpolation based on interpolation filters. Motion compensation unit 92 may use interpolation filters as used by video encoder 20 during encoding of the video blocks to calculate interpolated values for sub-integer pixels of reference blocks. In some examples, motion compensation unit 92 may determine the interpolation filters used by video encoder 20 from the received syntax elements and may use the interpolation filters to produce predictive blocks.

In some examples, motion compensation unit 92 may determine a disparity vector for the current video block. Motion compensation unit 92 may use the disparity vector for the current block to perform motion vector prediction for the current video block. For instance, motion compensation unit 92 may use the disparity vector for the current block to determine a corresponding block in an inter-view reference picture. In addition, motion compensation unit 92 may generate a motion vector candidate list (e.g., a merge candidate list or an AMVP candidate list) for the current video block. The motion vector candidate list may include one or more candidates that specify one or more motion vectors of the corresponding inter-view reference block. Motion compensation unit 92 may determine, based on one or more syntax elements obtained from the bitstream, a selected candidate in the candidate list. Motion compensation unit 92 may then determine one or more motion vectors for the current video block based on one or more motion vectors specified by the selected candidate. For instance, if the candidate list is a merge candidate list, motion compensation unit 92 may determine that a motion vector of the current video block matches a motion vector specified by the selected candidate. If the candidate list is an AMVP candidate list, motion compensation unit 92 may determine that a motion vector of the current video block is equal to a sum of a motion vector difference (MVD) signaled in the bitstream and a motion vector specified by the selected candidate.

In some examples, motion compensation unit 70 may use the disparity vector for the current video block to perform residual prediction (e.g., Advanced Residual Prediction) for the current video block. In such examples, motion compensation unit 92 may use the disparity vector to determine a residual predictor for the current block. The predictive block ultimately generated by motion compensation unit 92 may be based on a difference between a predictive block for the current video block and the residual predictor for the current video block.

Motion compensation unit 92 may use an NBDV derivation process to determine the disparity vector for the current video block. In accordance with one or more techniques of this disclosure, motion compensation unit 92 may initialize one or more DDVs for the current slice. Motion compensation unit 92 may use the one or more DDVs for the current slice in the NBDV derivation process to determine the disparity vector for the current video block. In some examples, motion compensation unit 92 initializes a single DDV for the current slice and updates the DDV such that, for each respective video block of the current slice after the first video block of the current slice, the DDV for the current slice specifies the disparity vector for the video block that occurs immediately prior to the respective video block in coding order.

In this way, motion compensation unit 92 may store a DDV for a current slice of a current picture. Furthermore, motion compensation unit 92 may derive, based at least in part on the DDV, an NBDV for a first video block of the current slice. Motion compensation unit 92 and other units of video decoder 30 may decode the first video block based at least in part on the NBDV for the first video block. Furthermore, motion compensation unit 92 may store the NBDV for the first video block as the DDV, thereby updating the DDV. After storing the NBDV for the first video block as the DDV, motion compensation unit 92 may derive, based at least in part on the updated DDV, an NBDV for a second video block of the current slice. Motion compensation unit 92 and other units of video decoder 30 may decode the second video block based at least in part on the NBDV for the second video block. Motion compensation unit 92 and other units of video decoder 30 may continue performing these actions for additional video blocks of the current slice.

Inverse quantization unit 84 may perform an inverse quantization process to inverse quantize, i.e., de-quantize, quantized transform coefficients signaled in the bitstream. The inverse quantization process may include use of a quantization parameter calculated by video encoder 20 for each video block in the current slice to determine a degree of quantization and, likewise, a degree of inverse quantization that should be applied. Inverse transform processing unit 86 may apply an inverse transform to the transform coefficients in order to produce residual blocks in the pixel domain. For example, inverse transform processing unit 86 may apply an inverse DCT, an inverse integer transform, or a conceptually similar inverse transform process to transform the transform coefficients.

After motion compensation unit 92 generates a predictive block for a current video block, video decoder 30 may form a decoded video block by summing samples values of residual blocks generated by inverse transform processing unit 86 with the corresponding sample values of predictive blocks generated by motion compensation unit 92. Summer 88 represents the component or components that perform this summation operation.

If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 90 (sometimes called a decoded picture buffer), which stores reference pictures used for subsequent motion compensation. Reference picture memory 90 may also store decoded video data for presentation on a display device, such as display device 32 of FIG. 1. Thus, reference picture memory 90 may be a memory that stores video data.

Figure 9A:
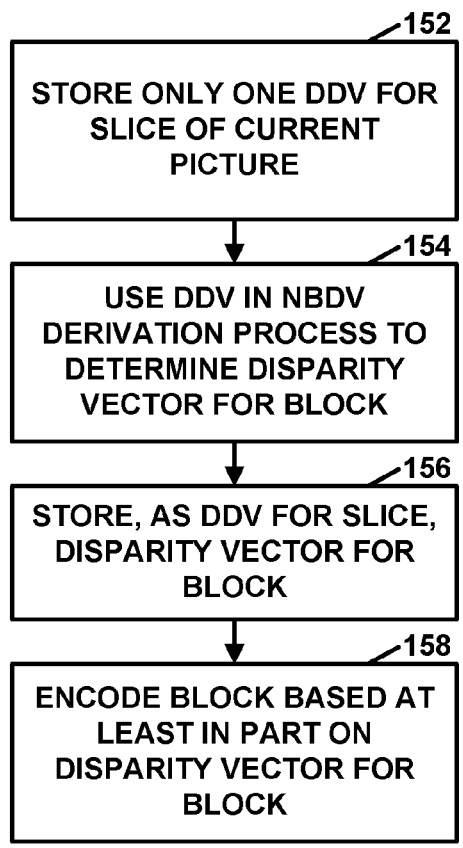
FIG. 9A is a flowchart illustrating an example operation of a video encoder, in accordance with an example of this disclosure.

FIG. 9A is a flowchart illustrating an example operation of video encoder 20, in accordance with an example of this disclosure. In other examples, video encoder 20 may perform operations similar to that of FIG. 9A, but that include more, fewer, or different actions. For instance, in other examples, one or more actions of FIG. 9A may be omitted, rearranged, or repeated. FIG. 9A is explained with reference to FIG. 7. However, the example of FIG. 9A is not so limited.

In the example of FIG. 9A, prediction processing unit 48 may store only one DDV for a slice of a current picture of the video data (152). The slice includes multiple blocks. Furthermore, prediction processing unit 48 may use the DDV for the slice in an NBDV derivation process to determine a disparity vector for a particular block (154). The particular block is one of the blocks of the slice. Furthermore, prediction processing unit 48 may store, as the DDV for the slice, the disparity vector (i.e., the NBDV) for the particular block (156).

Furthermore, in the example of FIG. 9A, video encoder 20 may encode the particular block based at least in part on the disparity vector for the particular block (158). For instance, video encoder 20 may use the NBDV for the particular block to perform inter-view motion prediction and/or inter-view residual prediction to generate an encoded representation of the particular block. In some examples, video encoder 20 continues the operation of FIG. 9A with regard to additional blocks of the slice. Furthermore, in some example, after storing the disparity vector for the particular block (i.e., a first block) as the DDV for the slice, prediction processing unit 48 may use the DDV for the slice in an NBDV derivation process to determine a disparity vector for a second block of the slice. Video encoder 20 may encode the second block based at least in part on the disparity vector for the second block. In some examples, the first block and the second block are macroblocks. In other examples, the first block and the second block are CUs, the first block and the second block are PUs, or the first block and the second block are LCUs.

Figure 9B:
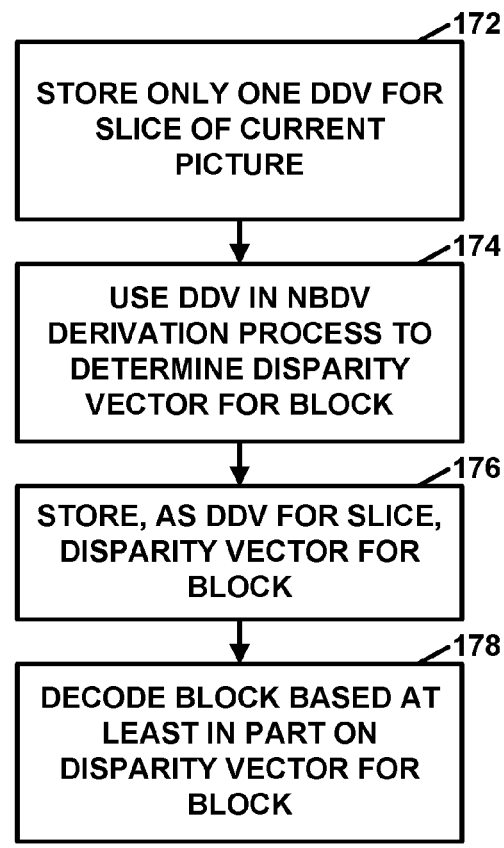
FIG. 9B is a flowchart illustrating an example operation of a video decoder, in accordance with an example of this disclosure.

FIG. 9B is a flowchart illustrating an example operation of video decoder 30, in accordance with an example of this disclosure. In other examples, video decoder 30 may perform operations similar to that of FIG. 9B, but that include more, fewer, or different actions. For instance, in other examples, one or more actions of FIG. 9A may be omitted, rearranged, or repeated. FIG. 9B is explained with reference to FIG. 8. However, the example of FIG. 9B is not so limited.

In the example of FIG. 9B, prediction processing unit 82 may store only one DDV for a slice of a current picture of the video data (172). The slice includes multiple blocks. Furthermore, prediction processing unit 82 may use the DDV for the slice in an NBDV derivation process to determine a disparity vector for a particular block (174). The particular block is one of the blocks of the slice. Furthermore, prediction processing unit 82 may store, as the DDV for the slice, the disparity vector (i.e., the NBDV) for the particular block (176).

Furthermore, in the example of FIG. 9B, video decoder 30 may decode the particular block based at least in part on the disparity vector (i.e., the NBDV) for the particular block (178). For instance, video decoder 30 may use the disparity vector for the particular block to perform inter-view motion prediction and/or inter-view residual prediction as part of a process to reconstruct a block of samples for the particular block. In some examples, after storing the disparity vector for the particular block (i.e., a first block) as the DDV for the slice, prediction processing unit 82 may use the DDV for the slice in an NBDV derivation process to determine a disparity vector for a second block of the slice. Video decoder 30 may decode the second block based at least in part on the disparity vector for the second block. For instance, video decoder 30 may use the disparity vector (i.e., the NBDV) for the second block to perform inter-view motion prediction and/or inter-view residual prediction as part of a process to reconstruct a block of samples for the second block. In some examples, the particular block (i.e., a first block) and the second block are macroblocks. In other examples, the first block and the second block are CUs, the first block and the second block are PUs, or the first block and the second block are LCUs. In some examples, video decoder 30 may continue the operation of FIG. 9B with regard to additional blocks of the slice.

Figure 10:
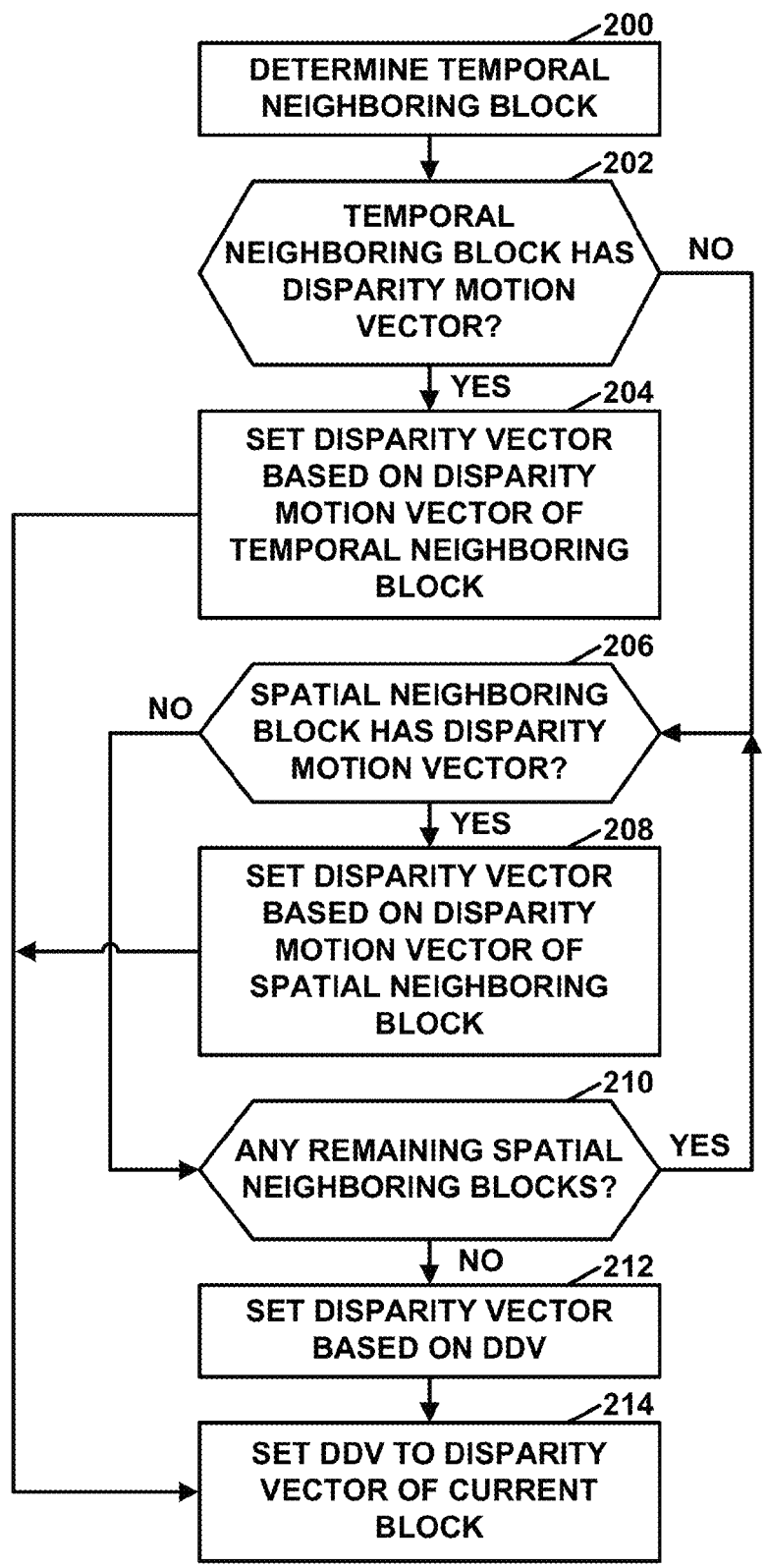
FIG. 10 is a flowchart illustrating an example disparity vector derivation operation, in accordance with an example of this disclosure.

FIG. 10 is a flowchart illustrating an example disparity vector derivation operation, in accordance with an example of this disclosure. In other examples, a video coder may perform operations similar to that of FIG. 10, but that include more, fewer, or different actions. For instance, in other examples, one or more actions of FIG. 10 may be omitted, rearranged, or repeated. A video coder, such as video encoder 20 or video decoder 30, may perform the example disparity vector derivation operation of FIG. 10. The video coder may perform the operation of FIG. 10 to determine a disparity vector for a current block of a current slice of a current picture. In different examples, the current block may be a macroblock, CU, PU, LCU, or another type of block or video block.

In the example of FIG. 10, the video coder may determine a temporal neighboring block for the current block (200). The temporal neighboring block may be a block of a reference picture in a different access unit than the current picture. Furthermore, the video coder may determine whether the temporal neighboring block has a disparity motion vector (202). Responsive to determining that the temporal neighboring block has a disparity motion vector ("YES" of 202), the video coder may set the disparity vector for the current block based on the disparity motion vector of the temporal neighboring block (204). For example, the video coder may set the horizontal component of the disparity vector for the current block to the horizontal component of the disparity motion vector of the temporal neighboring block and may set the vertical component of the disparity vector for the current block equal to 0. In other examples, the video coder may set the disparity vector for the current block equal to the disparity motion vector for the temporal neighboring block.

On the other hand, responsive to determining that the temporal neighboring block does not have a disparity motion vector ("NO" of 202), the video coder may determine whether a spatial neighboring block has a disparity motion vector (206). The spatial neighboring block may be a block covering one or more of locations A, B, C, or D in FIG. 5. Responsive to determining that the spatial neighboring block has a disparity motion vector ("YES" of 206), the video coder may set the disparity vector for the current block based on the disparity motion vector of the temporal neighboring block (208). For example, the video coder may set the horizontal component of the disparity vector for the current block to the horizontal component of the disparity motion vector of the spatial neighboring block and may set the vertical component of the disparity vector for the current block equal to 0. In other examples, the video coder may set the disparity vector for the current block equal to the disparity motion vector for the spatial neighboring block.

Responsive to determining that the spatial neighboring block does not have a disparity motion vector ("NO" of

206), the video coder may determine whether there are any remaining spatial neighboring blocks to check (210). In response to determining that there are one or more remaining spatial neighboring blocks ("YES" of 210), the video coder may repeat action (206) and, if appropriate, action (208) with regard to another spatial neighboring block. In this way, the video coder may check each of the spatial neighboring blocks until the video decoder determines that one of the spatial neighboring blocks has a disparity motion vector or there are no remaining spatial neighboring blocks to check. In response to determining that there are no remaining spatial neighboring blocks to check ("NO" of 210), the video coder may set the disparity vector for the current block based on the DDV (212). For instance, the video coder may set the disparity vector for the current block equal as the DDV.

After setting the disparity vector in (204), (208), or (212), the video coder may set the DDV to the disparity vector for the current block (214). In this way, the video coder updates the DDV for use by a subsequent block in the current slice.

The following are additional examples in accordance with one or more techniques of this disclosure.

Example 1

A method of encoding video data according to any of the embodiments disclosed herein.

Example 2

A method of decoding video data according to any of the embodiments disclosed herein.

Example 3

A computer readable medium having stored thereon instructions which when executed perform any of the methods of examples 1 to 2.

Example 4

An apparatus comprising a processor, wherein the processor is configured to perform any of the methods of examples 1 to 2.

Example 5

A method of encoding video data, the method comprising: storing one or more derived disparity vectors (DDVs) from one or more previously-coded blocks of a slice; deriving, based at least in part on the one or more stored DDVs, a neighboring block-based disparity vector (NBDV) for a current block of the slice; and encoding the current block based at least in part on the NBDV for the current block.

Example 6

The method of example 5, wherein: the stored DDVs include a stored DDV for a block to the left of the current block, and deriving the NBDV for the current block comprises deriving, based at least in part on the stored DDV for the block to the left of the current block, the NBDV for the current block.

Example 7

The method of example 5, wherein: the method further comprises determining whether the one or more stored DDVs include a stored DDV for a block to the left of the current block; and deriving the NBDV for the current block comprises in response to determining that the one or more stored DDVs include the stored DDV for the block to the left of the current block, determining, based at least in part on the stored DDV for the block to the left of the current block, the NBDV for the current block.

Example 8

The method of example 5, wherein storing the one or more DDVs comprises storing a DDV for a block in response to determining that a magnitude of the DDV of the block is larger than a magnitude of a previously-stored DDV.

Example 9

The method of example 5, wherein deriving the NBDV for the current block comprises deriving the NBDV for the current block based at least in part on a stored DDV, disparity motion vectors for temporal neighboring blocks (TDVs) and disparity motion vectors for spatial neighboring blocks (SDVs).

Example 10

The method of example 9, wherein deriving the NBDV for the current block comprises in response to determining that none of the TDVs or SDVs is available for use in determining the NBDV for the current block, determining that the NBDV for the current block is equal to the stored DDV.

Example 11

The method of example 9, wherein deriving the NBDV for the current block comprises when an available non-zero disparity vector is identified from among the stored DDV, the TDVs, and the SDVs while checking the stored DDV, the TDVs and the SDVs in a predefined order, determining that the NBDV for the current block is equal to the available non-zero disparity vector.

Example 12

The method of example 5, wherein: storing the one or more DDVs comprises storing two or more DDVs from two or more previously-coded blocks of the slice, the two or more stored DDVs having a particular order, and deriving the NBDV for the current block comprises when an available non-zero disparity vector is identified from among TDVs, SDVs, and the two or more stored DDVs while checking the TDVs, the SDVs, and the two or more stored DDVs in a predefined checking order, determining that the NBDV for the current block is equal to the available non-zero disparity vector, wherein in the predefined checking order the two or more stored DDVs are checked according to the particular order.

Example 13

The method of example 5, wherein deriving the NBDV for the current block comprises, in response to determining that accessing a depth view component is disallowed, deriving the NBDV for the current block based at least in part on the one or more stored DDVs.

Example 14

The method of example 5, wherein deriving the NBDV for the current block comprises: when accessing a base/reference view depth view component is allowed, determining, based at least in part on the one or more stored DDVs, an initial NBDV for the current block; and using the initial NBDV for the current block to identify a potentially more accurate depth block to refine the initial NBDV for the current block.

Example 15

The method of example 5, further comprising, when accessing a base/reference view depth view component is allowed, refining the one or more stored DDVs.

Example 16

The method of example 5, wherein the current block is a macroblock, prediction unit (PU), coding unit (CU), or largest coding unit (LCU).

Example 17

The method of example 5, wherein the number of stored DDVs is proportional to the number of blocks in one macroblock, coding unit, or largest coding unit (LCU).

Example 18

The method of example 5, wherein the number of stored DDVs is not proportional to a width or height of a picture associated with the current block or a number of blocks in the slice.

Example 19

The method of example 5, wherein the method further comprises updating a stored DDV only when the current block is coded using an NBDV result.

Example 20

The method of example 5, further comprising updating a stored DDV only when the current block is inter coded.

Example 21

The method of example 5, further comprising updating a stored DDV only when the slice is inter coded.

Example 22

The method of example 5, further comprising updating a stored DDV when the current block is coded with skip/direct mode.

Example 23

The method of example 5, wherein only one DDV is maintained for the slice and the DDV is updated once a coding unit (CU) is coded.

Example 24

The method of example 23, further comprising: when the slice is not intra coded, invoking NBDV for each respective CU of the slice regardless of whether the respective CU uses NBDV and using an NBDV result to update the DDV.

Example 25

The method of example 23, further comprising: when the CU is inter coded, invoking NBDV for the CU to determine an NBDV result and using the NBDV result to update the DDV; when the CU is not inter coded, refraining from updating the DDV.

Example 26

The method of example 23, further comprising: when a prediction unit (PU) within the CU is coded using an NBDV result, using the NBDV result to update the DDV; and when the PU is not coded using the NBDV result, refraining from updating the DDV.

Example 27

The method of example 23, further comprising: when at least one PU within the CU is coded with skip mode, using an NBDV result to update the DDV.

Example 28

The method of example 5, wherein only one DDV is maintained for the slice and the DDV is updated once a PU is coded.

Example 29

The method of example 28, further comprising: when the slice is not intra coded, invoking NBDV for each respective PU of the slice regardless of whether the respective PU uses NBDV and using an NBDV result to update the DDV.

Example 30

The method of example 28, further comprising: when the PU is inter coded, invoking NBDV for the PU to determine an NBDV result and using the NBDV result to update the DDV; when the PU is not inter coded, refraining from updating the DDV.

Example 31

The method of example 28, further comprising: when the PU is coded using an NBDV result, using the NBDV result to update the DDV; and when the PU is not coded using the NBDV result, refraining from updating the DDV.

Example 32

The method of example 28, further comprising: when the PU is coded with skip mode, using an NBDV result to update the DDV.

Example 33

The method of examples 23 or 28, further comprising using the DDV to derive an NBDV when spatial and temporal neighboring blocks do not contain a disparity motion vector, wherein the NBDV is set to be equal to the DDV.

Example 34

The method of example 33, further comprising refining the NBDV by accessing a depth of a reference view.

Example 35

The method of example 33, further comprising: generating a refined disparity vector by accessing a depth of a reference view using the NBDV; and setting the DDV to be equal to the refined disparity vector.

Example 36

The method of example 5, wherein storing the one or more DDVs comprises storing only horizontal components of the one or more DDVs and setting vertical components of the one or more DDVs equal to 0.

Example 37

A method comprising any combination of examples 5-36.

Example 38

A method of decoding video data, the method comprising: storing one or more derived disparity vectors (DDVs) from one or more previously-coded blocks of a slice; deriving, based at least in part on the one or more stored DDVs, a neighboring block-based disparity vector (NBDV) for a current block of the slice; and decoding the current block based at least in part on the NBDV for the current block.

Example 39

The method of example 38, wherein: the stored DDVs include a stored DDV for a block to the left of the current block, and deriving the NBDV for the current block comprises deriving, based at least in part on the stored DDV for the block to the left of the current block, the NBDV for the current block.

Example 40

The method of example 38, wherein: the method further comprises determining whether the one or more stored DDVs include a stored DDV for a block to the left of the current block; and deriving the NBDV for the current block comprises in response to determining that the one or more stored DDVs include the stored DDV for the block to the left of the current block, determining, based at least in part on the stored DDV for the block to the left of the current block, the NBDV for the current block.

Example 41

The method of example 38, wherein storing the one or more DDVs comprises storing a DDV for a block in response to determining that a magnitude of the DDV of the block is larger than a magnitude of a previously-stored DDV.

Example 42

The method of example 38, wherein deriving the NBDV for the current block comprises deriving the NBDV for the current block based at least in part on a stored DDV, disparity motion vectors for temporal neighboring blocks (TDVs) and disparity motion vectors for spatial neighboring blocks (SDVs).

Example 43

The method of example 42, wherein deriving the NBDV for the current block comprises in response to determining that none of the TDVs or SDVs is available for use in determining the NBDV for the current block, determining that the NBDV for the current block is equal to the stored DDV.

Example 44

The method of example 42, wherein deriving the NBDV for the current block comprises when an available non-zero disparity vector is identified from among the stored DDV, the TDVs, and the SDVs while checking the stored DDV, the TDVs and the SDVs in a predefined order, determining that the NBDV for the current block is equal to the available non-zero disparity vector.

Example 45

The method of example 38, wherein: storing the one or more DDVs comprises storing two or more DDVs from two or more previously-coded blocks of the slice, the two or more stored DDVs having a particular order, and deriving the NBDV for the current block comprises when an available non-zero disparity vector is identified from among TDVs, SDVs, and the two or more stored DDVs while checking the TDVs, the SDVs, and the two or more stored DDVs in a predefined checking order, determining that the NBDV for the current block is equal to the available non-zero disparity vector, wherein in the predefined checking order the two or more stored DDVs are checked according to the particular order.

Example 46

The method of example 38, wherein deriving the NBDV for the current block comprises, in response to determining that accessing a depth view component is disallowed, deriving the NBDV for the current block based at least in part on the one or more stored DDVs.

Example 47

The method of example 38, wherein deriving the NBDV for the current block comprises: when accessing a base/reference view depth view component is allowed, determining, based at least in part on the one or more stored DDVs, an initial NBDV for the current block; and using the initial NBDV for the current block to identify a potentially more accurate depth block to refine the initial NBDV for the current block.

Example 48

The method of example 38, further comprising, when accessing a base/reference view depth view component is allowed, refining the one or more stored DDVs.

Example 49

The method of example 38, wherein the current block is a macroblock, prediction unit (PU), coding unit (CU), or largest coding unit (LCU).

Example 50

The method of example 38, wherein the number of stored DDVs is proportional to the number of blocks in one macroblock, coding unit, or largest coding unit (LCU).

Example 51

The method of example 38, wherein the number of stored DDVs is not proportional to a width or height of a picture associated with the current block or a number of blocks in the slice.

Example 52

The method of example 38, wherein only one DDV is maintained for the slice and the DDV is updated once a coding unit (CU) is coded.

Example 53

The method of example 52, further comprising: when the slice is not intra coded, invoking NBDV for each respective CU of the slice regardless of whether the respective CU uses NBDV and using an NBDV result to update the DDV.

Example 54

The method of example 52, further comprising: when the CU is inter coded, invoking NBDV for the CU to determine an NBDV result and using the NBDV result to update the DDV; when the CU is not inter coded, refraining from updating the DDV.

Example 55

The method of example 52, further comprising: when a prediction unit (PU) within the CU is coded using an NBDV result, using the NBDV result to update the DDV; and when the PU is not coded using the NBDV result, refraining from updating the DDV.

Example 56

The method of example 52, further comprising: when at least one PU within the CU is coded with skip mode, using an NBDV result to update the DDV.

Example 57

The method of example 38, wherein only one DDV is maintained for the slice and the DDV is updated once a PU is coded.

Example 58

The method of example 57, further comprising: when the slice is not intra coded, invoking NBDV for each respective PU of the slice regardless of whether the respective PU uses NBDV and using an NBDV result to update the DDV.

Example 59

The method of example 57, further comprising: when the PU is inter coded, invoking NBDV for the PU to determine an NBDV result and using the NBDV result to update the DDV; when the PU is not inter coded, refraining from updating the DDV.

Example 60

The method of example 57, further comprising: when the PU is coded using an NBDV result, using the NBDV result to update the DDV; and when the PU is not coded using the NBDV result, refraining from updating the DDV.

Example 61

The method of example 57, further comprising: when the PU is coded with skip mode, using an NBDV result to update the DDV.

Example 62

The method of examples 52 or 57, further comprising using the DDV to derive an NBDV when spatial and temporal neighboring blocks do not contain a disparity motion vector, wherein the NBDV is set to be equal to the DDV.

Example 63

The method of example 62, further comprising refining the NBDV by accessing a depth of a reference view.

Example 64

The method of example 62, further comprising: generating a refined disparity vector by accessing a depth of a reference view using the NBDV; and setting the DDV to be equal to the refined disparity vector.

Example 65

The method of example 38, wherein storing the one or more DDVs comprises storing only horizontal components of the one or more DDVs and setting vertical components of the one or more DDVs equal to 0.

Example 66

A method comprising any of combination of examples 38-65.

Example 67

An apparatus configured to encode video data, the apparatus comprising: means for storing one or more derived disparity vectors (DDVs) from one or more previously-coded blocks of a slice; means for deriving, based at least in part on the one or more stored DDVs, a neighboring block-based disparity vector (NBDV) for a current block of the slice; and means for encoding the current block based at least in part on the NBDV for the current block.

Example 68

The apparatus of example 67, further comprising means for performing any of the methods of examples 6-36.

Example 69

An apparatus configured to decode video data, the apparatus comprising: means for storing one or more derived disparity vectors (DDVs) from one or more previously-coded blocks of a slice; means for deriving, based at least in part on the one or more stored DDVs, a neighboring block-based disparity vector (NBDV) for a current block of the slice; and means for decoding the current block based at least in part on the NBDV for the current block.

Example 70

The apparatus of example 69, further comprising means for performing any of the methods of examples 38-65.

Example 71

An video encoding device comprising one or more processors configured to implement the method of any of examples 1-36.

Example 72

An video decoding device comprising one or more processors configured to implement the method of any of examples 38-65.

Example 73

A computer-readable storage medium having instructions stored thereon that, when executed by a video encoding apparatus, configure the video encoding apparatus to perform the method of any of examples 1-36.

Example 74

A computer-readable storage medium having instructions stored thereon that, when executed by a video decoding apparatus, configure the video encoding apparatus to perform the method of any of examples 38-65.

Example 75

A method for decoding video data, the method comprising: deriving, based on one or more neighboring blocks, a variable for a current block of a picture, wherein the variable is not directly or indirectly signaled in a bitstream; using the variable to decode the current block; and updating the variable after the current block is decoded.

Example 76

A device comprising a video decoder configured to: derive, based on one or more neighboring blocks, a variable for a current block of a picture, wherein the variable is not directly or indirectly signaled in a bitstream; use the variable to decode the current block; and update the variable after the current block is decoded.

Example 77

A device comprising: means for deriving, based on one or more neighboring blocks, a variable for a current block of a picture, wherein the variable is not directly or indirectly signaled in a bitstream; means for using the variable to decode the current block; and means for updating the variable after the current block is decoded.

Example 78

A computer-readable storage medium having instructions stored thereon that, when executed, configure a video decoding device to: derive, based on one or more neighboring blocks, a variable for a current block of a picture, wherein the variable is not directly or indirectly signaled in a bitstream; use the variable to decode the current block; and update the variable after the current block is decoded.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   storing only one derived disparity vector (DDV) for a slice of a current picture of the video data, wherein the slice includes multiple blocks;
   using the DDV for the slice in a Neighboring Block Based Disparity Vector (NBDV) derivation process to determine a disparity vector for a particular block, wherein the particular block is one of the blocks of the slice, wherein using the DDV for the slice in the NBDV derivation process comprises:
      determining whether a temporal neighboring block has a disparity motion vector;
      responsive to determining that the temporal neighboring block has a disparity motion vector, deriving the disparity vector for the particular block based on the disparity motion vector of the temporal neighboring block;
      responsive to determining that the temporal neighboring block does not have a disparity motion vector, determining whether any spatial neighboring block in a plurality of spatial neighboring blocks has a disparity motion vector;
      responsive to determining that a particular spatial neighboring block in the plurality of spatial neighboring blocks has a disparity motion vector, deriving the disparity vector for the particular block based on the disparity motion vector of the particular spatial neighboring block; and
      responsive to determining that no spatial neighboring block in the plurality of spatial neighboring blocks has a disparity motion vector, deriving the disparity vector for the particular block as the DDV for the slice; and
   storing, as the DDV for the slice, the disparity vector for the particular block.

2. The method of claim 1, further comprising decoding the particular block based at least in part on the disparity vector for the particular block.

3. The method of claim 1, wherein the particular block is a first block, and the method further comprises, after storing, as the DDV for the slice, the disparity vector for the first block:
   using the DDV for the slice in an NBDV derivation process to determine a disparity vector for a second block, wherein the second block is one of the blocks of the slice; and
   decoding the second block based at least in part on the disparity vector for the second block.

4. The method of claim 3, wherein the first block is immediately to the left of the second block.

5. The method of claim 3, wherein the first block is a macroblock and the second block is a macroblock.

6. The method of claim 3, wherein the first block and the second block are coding units (CUs), the first block and the second block are prediction units (PUs), or the first block and the second block are largest coding units (LCUs).

7. The method of claim 1, wherein using the DDV for the slice in the NBDV derivation process comprises using the DDV for the slice, a disparity motion vector for a temporal neighboring block, and a disparity motion vector for a spatial neighboring block to derive the disparity vector for the particular block.

8. The method of claim 1, further comprising updating the DDV for the slice once for each block of the slice that is coded after the particular block.

9. The method of claim 1, wherein storing, as the DDV for the slice, the disparity vector for the particular block comprises updating the DDV for the slice to specify the disparity vector for the particular block responsive to a condition being satisfied, the condition being one of:
   the particular block is coded using inter-view motion prediction;
   the particular block is inter coded;
   the slice is inter coded;
   the particular block is coded with skip mode or direct mode;
   a magnitude of the disparity vector for the particular block is larger than a magnitude of the DDV for the slice; and
   the DDV for the slice is non-zero.

10. The method of claim 1, further comprising refining, based on depth pixels in a depth view component, the disparity vector for the particular block,
    wherein storing, as the DDV for the slice, the disparity vector for the particular block comprises updating the DDV for the slice to specify the refined disparity vector for the particular block.

11. The method of claim 1, wherein the method further comprises not storing implicit disparity vectors for any of the blocks of the slice.

12. The method of claim 1, the method being executable on a wireless communication device, wherein the device comprises:
    a memory configured to store video data;
    a processor configured to execute instructions to process the video data stored in said memory;
    a receiver configured to receive a bitstream that includes a sequence of bits that forms a representation of coded pictures of the video data.

13. The method of claim 12, wherein the wireless communication device is a cellular telephone and the bitstream is received by the receiver and modulated according to a cellular communication standard.

14. A method of encoding video data, the method comprising:
    storing only one derived disparity vector (DDV) for a slice of a current picture of the video data, wherein the slice includes multiple blocks;
    using the DDV for the slice in a Neighboring Block Based Disparity Vector (NBDV) derivation process to determine a disparity vector for a particular block, wherein the particular block is one of the blocks of the slice, wherein using the DDV for the slice in the NBDV derivation process comprises:
       determining whether a temporal neighboring block has a disparity motion vector;
       responsive to determining that the temporal neighboring block has a disparity motion vector, deriving the disparity vector for the particular block based on the disparity motion vector of the temporal neighboring block;

responsive to determining that the temporal neighboring block does not have a disparity motion vector, determining whether any spatial neighboring block in a plurality of spatial neighboring blocks has a disparity motion vector;

responsive to determining that a particular spatial neighboring block in the plurality of spatial neighboring blocks has a disparity motion vector, deriving the disparity vector for the particular block based on the disparity motion vector of the particular spatial neighboring block; and responsive to determining that no spatial neighboring block in the plurality of spatial neighboring blocks has a disparity motion vector, deriving the disparity vector for the particular block as the DDV for the slice; and storing, as the DDV for the slice, the disparity vector for the particular block.

15. The method of claim 14, further comprising encoding the particular block based at least in part on the disparity vector for the particular block.

16. The method of claim 14, wherein the particular block is a first block, and the method further comprises, after storing, as the DDV for the slice, the disparity vector for the first block:

using the DDV for the slice in an NBDV derivation process to determine a disparity vector for a second block, wherein the second block is one of the blocks of the slice; and encoding the second block based at least in part on the disparity vector for the second block.

17. The method of claim 16, wherein the first block is immediately to the left of the second block.

18. The method of claim 16, wherein the first block is a macroblock and the second block is a macroblock.

19. The method of claim 16, wherein the first block and the second block are coding units (CUs), the first block and the second block are prediction units (PUs), or the first block and the second block are largest coding units (LCUs).

20. The method of claim 14, wherein using the DDV for the slice in the NBDV derivation process for the particular block comprises using the DDV for the slice, a disparity motion vector for a temporal neighboring block, and a disparity motion vector for a spatial neighboring block to derive the disparity vector for the particular block.

21. The method of claim 14, further comprising updating the DDV for the slice once for each block of the slice that is coded after the particular block.

22. The method of claim 14, wherein storing, as the DDV for the slice, the disparity vector for the particular block comprises updating the DDV for the slice to specify the disparity vector for the particular block responsive to a condition being satisfied, the condition being one of:

the particular block is coded using inter-view motion prediction;
the particular block is inter coded;
the slice is inter coded;
the particular block is coded with skip mode or direct mode;
a magnitude of the disparity vector for the particular block is larger than a magnitude of the DDV for the slice; and
the DDV for the slice is non-zero.

23. The method of claim 14, further comprising refining, based on depth pixels in a depth view component, the disparity vector for the particular block, wherein storing, as the DDV for the slice, the disparity vector for the particular block comprises updating the DDV for the slice to specify the refined disparity vector for the particular block.

24. The method of claim 14, wherein the method further comprises not storing implicit disparity vectors for any of the blocks of the slice.

25. A video coding device comprising:
a memory that stores video data; and
one or more processors configured to:
store only one derived disparity vector (DDV) for a slice of a current picture of the video data, wherein the slice includes multiple blocks;
use the DDV for the slice in a Neighboring Block Based Disparity Vector (NBDV) derivation process to determine a disparity vector for a particular block, wherein the particular block is one of the blocks of the slice, wherein the one or more processors are configured such that, as part of using the DDV for the slice in the NBDV derivation process, the one or more processors:

determine whether a temporal neighboring block has a disparity motion vector:

responsive to determining that the temporal neighboring block has a disparity motion vector, derive the disparity vector for the particular block based on the disparity motion vector of the temporal neighboring block;

responsive to determining that the temporal neighboring block does not have a disparity motion vector, determine whether any spatial neighboring block in a plurality of spatial neighboring blocks has a disparity motion vector;

responsive to determining that a particular spatial neighboring block in the plurality of spatial neighboring blocks has a disparity motion vector, derive the disparity vector for the particular block based on the disparity motion vector of the particular spatial neighboring block; and responsive to determining that no spatial neighboring block in the plurality of spatial neighboring blocks has a disparity motion vector, derive the disparity vector for the particular block as the DDV for the slice; and store, as the DDV for the slice, the disparity vector for the particular block.

26. The video coding device of claim 25, wherein the one or more processors are configured to encode the particular block based at least in part on the disparity vector for the particular block.

27. The video coding device of claim 25, wherein the one or more processors are configured to decode the particular block based at least in part on the disparity vector for the particular block.

28. The video coding device of claim 25, wherein the particular block is a first block, and the one or more processors are further configured such that after, after storing, as the DDV for the slice, the disparity vector for the first block, the one or more processors:

use the DDV for the slice in an NBDV derivation process to determine a disparity vector for a second block, wherein the second block is one of the blocks of the slice; and coding the second block based at least in part on the disparity vector for the second block.

29. The video coding device of claim 28, wherein the first block is immediately to the left of the second block.

30. The video coding device of claim 28, wherein the first block is a macroblock and the second block is a macroblock.

31. The video coding device of claim 28, wherein the first block and the second block are coding units (CUs), the first block and the second block are prediction units (PUs), or the first block and the second block are largest coding units (LCUs).

32. The video coding device of claim 25, wherein the one or more processors are configured to use the DDV for the slice, a disparity motion vector for a temporal neighboring block, and a disparity motion vector for a spatial neighboring block to derive the disparity vector for the particular block.

33. The video coding device of claim 25, wherein the one or more processors are configured to update the DDV once for each block of the slice that is coded after the first block.

34. The video coding device of claim 25, wherein the one or more processors are configured to update the DDV for the slice to specify the disparity vector for the particular block responsive to a condition being satisfied, the condition being one of:
   the particular block is coded using inter-view motion prediction;
   the particular block is inter coded;
   the slice is inter coded;
   the particular block is coded with skip mode or direct mode;
   a magnitude of the disparity vector for the particular block is larger than a magnitude of the DDV for the slice; and
   the DDV for the slice is non-zero.

35. The video coding device of claim 25, wherein the one or more processors are configured to refine, based on depth pixels in a depth view component, the disparity vector for the particular block; and
   wherein the one or more processors are configured to update the DDV for the slice to specify the refined disparity vector for the particular block.

36. The video coding device of claim 25, wherein the one or more processors are configured not to store implicit disparity vectors for any block of the slice.

37. The video coding device of claim 25, wherein the device is a wireless communication device, further comprising:
   a receiver configured to receive a bitstream that includes a sequence of bits that forms a representation of coded pictures of the video data.

38. The video coding device of claim 37, wherein the wireless communication device is a cellular telephone and the bitstream is received by the receiver and modulated according to a cellular communication standard.

39. A video coding device configured to code video data, the video coding device comprising:
   means for storing only one derived disparity vector (DDV) for a slice of a current picture of the video data, wherein the slice includes multiple blocks;
   means for using the DDV for the slice in a Neighboring Block Based Disparity Vector (NBDV) derivation process to determine a disparity vector for a particular block, wherein the particular block is one of the blocks of the slice, wherein the means for using the DDV for the slice in the NBDV derivation process comprises:
      means for determining whether a temporal neighboring block has a disparity motion vector;
      means for deriving, responsive to determining that the temporal neighboring block has a disparity motion vector, the disparity vector for the particular block based on the disparity motion vector of the temporal neighboring block;
      means for determining, responsive to determining that the temporal neighboring block does not have a disparity motion vector, whether any spatial neighboring block in a plurality of spatial neighboring blocks has a disparity motion vector;
      means for deriving, responsive to determining that a particular spatial neighboring block in the plurality of spatial neighboring blocks has a disparity motion vector, the disparity vector for the particular block based on the disparity motion vector of the particular spatial neighboring block; and
      means for deriving, responsive to determining that no spatial neighboring block in the plurality of spatial neighboring blocks has a disparity motion vector, the disparity vector for the particular block as the DDV for the slice; and
   means for storing, as the DDV for the slice, the disparity vector for the particular block.

40. A non-transitory computer-readable medium having instructions stored thereon that, when executed, cause one or more processors of a video coding device to:
   store only one derived disparity vector (DDV) for a slice of a current picture of the video data, wherein the slice includes multiple blocks;
   use the DDV for the slice in a Neighboring Block Based Disparity Vector (NBDV) derivation process to determine a disparity vector for a particular block, wherein the particular block is one of the blocks of the slice, wherein as part of causing the one or more processors to use the DDV for the slice in the NBDV derivation process, the instructions cause the one or more processors to:
      determine whether a temporal neighboring block has a disparity motion vector;
      responsive to determining that the temporal neighboring block has a disparity motion vector, derive the disparity vector for the particular block based on the disparity motion vector of the temporal neighboring block;
      responsive to determining that the temporal neighboring block does not have a disparity motion vector, determine whether any spatial neighboring block in a plurality of spatial neighboring blocks has a disparity motion vector;
      responsive to determining that a particular spatial neighboring block in the plurality of spatial neighboring blocks has a disparity motion vector, derive the disparity vector for the particular block based on the disparity motion vector of the particular spatial neighboring block; and
      responsive to determining that no spatial neighboring block in the plurality of spatial neighboring blocks has a disparity motion vector, derive the disparity vector for the particular block as the DDV for the slice; and
   store, as the DDV for the slice, the disparity vector for the particular block.

* * * * *